(12) United States Patent
Yoshida et al.

(10) Patent No.: US 9,335,185 B2
(45) Date of Patent: May 10, 2016

(54) ENCODER, MOTOR WITH ENCODER, AND SERVO SYSTEM

(71) Applicant: KABUSHIKI KAISHA YASKAWA DENKI, Kitakyushu-shi (JP)

(72) Inventors: Yasushi Yoshida, Kitakyushu (JP); Yasuhiro Matsutani, Kitayushu (JP); Shiro Yoshidomi, Kitakyushu (JP); Hiroshi Takada, Kitakyushu (JP); Yuji Arinaga, Kitakyushu (JP); Ikuma Murokita, Kitakyushu (JP); Masanobu Harada, Kitakyushu (JP); Hiroki Kondo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 57 days.

(21) Appl. No.: 14/532,003

(22) Filed: Nov. 4, 2014

(65) Prior Publication Data

US 2015/0123586 A1 May 7, 2015

(30) Foreign Application Priority Data

Nov. 5, 2013 (JP) ................................. 2013-229836

(51) Int. Cl.
| | |
|---|---|
| *G01D 5/347* | (2006.01) |
| *G01D 5/245* | (2006.01) |
| *H02K 11/00* | (2016.01) |
| *G05B 1/04* | (2006.01) |

(52) U.S. Cl.
CPC .......... *G01D 5/3473* (2013.01); *G01D 5/34746* (2013.01); *G05B 1/04* (2013.01); *H02K 11/0026* (2013.01); *H02K 11/22* (2016.01); *G05B 2219/37104* (2013.01)

(58) Field of Classification Search
CPC ............ G01D 5/34792; G01D 5/3473; G01D 5/34715; G01D 5/34776; G01D 5/347; G01D 5/24461; G01D 5/34707; G01D 5/3476; G01D 5/145; G01D 5/34784; G01D 5/24466; G01D 5/24476; G01D 5/2448; G01D 5/2452; G01D 5/245; G05B 23/0205
USPC .......................... 318/600–605, 652, 653, 661
See application file for complete search history.

(56) References Cited

U.S. PATENT DOCUMENTS

| | | | | |
|---|---|---|---|---|
| 6,246,050 | B1 * | 6/2001 | Tullis ..................... | G01D 5/347 250/231.13 |
| 6,660,997 | B2 * | 12/2003 | Laberge ................... | G01D 5/26 250/231.18 |
| 8,094,323 | B2 * | 1/2012 | Kapner .............. | G01D 5/34715 250/231.13 |
| 2013/0229138 | A1 | 9/2013 | Yoshida et al. | |

FOREIGN PATENT DOCUMENTS

JP          2012-103032          5/2012

* cited by examiner

*Primary Examiner* — Bentsu Ro
(74) *Attorney, Agent, or Firm* — Mori & Ward, LLP

(57) ABSTRACT

The encoder includes a plurality of slit tracks, a point light source, two first light-receiving arrays, two second light-receiving arrays, and a third light-receiving array. The plurality of slit tracks respectively comprises a plurality of reflection slits arranged along a measurement direction. The point light source is configured to emit diffusion light to the plurality of slit tracks. The two first light-receiving arrays are disposed sandwiching the point light source in a width direction substantially orthogonal to the measurement direction. The two second light-receiving arrays are disposed sandwiching the point light source in the measurement direction. The third light-receiving array is configured to receive light reflected by the slit track comprising an incremental pattern that differs in pitch from other incremental patterns, and is disposed at a position in a direction where the first light-receiving array is disposed than the point light source.

17 Claims, 19 Drawing Sheets

COMPARISON EXAMPLE

EMBODIMENT 2

COMPARISON EXAMPLE

EMBODIMENT 3

ENCODER, MOTOR WITH ENCODER, AND SERVO SYSTEM

CROSS-REFERENCE TO RELATED APPLICATION

The present application claims priority from Japanese Patent Application No. 2013-229836, which was filed on Nov. 5, 2013, the disclosure of which is incorporated herein by reference in its entirety.

BACKGROUND OF THE INVENTION

1. Field of the Invention

The present disclosure relates to an encoder, a motor with an encoder, and a servo system.

2. Description of the Related Art

A reflection type encoder is known.

SUMMARY OF THE INVENTION

According to one aspect of the disclosure, there is provided an encoder. The encoder comprises a plurality of slit tracks, a point light source, two first light-receiving arrays, two second light-receiving arrays, and a third light-receiving array. The plurality of slit tracks respectively comprises a plurality of reflection slits arranged along a measurement direction. The point light source is configured to emit diffusion light to the plurality of slit tracks. The two first light-receiving arrays are disposed sandwiching the point light source in a width direction substantially orthogonal to the measurement direction. The two second light-receiving arrays are disposed sandwiching the point light source in the measurement direction. The third light-receiving array is configured to receive light reflected by the slit track comprising an incremental pattern that differs in pitch from other incremental patterns, and is disposed at a position in a direction where the first light-receiving array is disposed than the point light source.

According to another aspect of the disclosure, there is provided an encoder. The encoder comprising a plurality of slit tracks, a point light source, two first light-receiving arrays, two second light-receiving arrays, and two third light-receiving arrays. The plurality of slit tracks respectively comprises a plurality of reflection slits arranged along a measurement direction. The point light source is configured to emit diffusion light to the plurality of slit tracks. The two first light-receiving arrays are disposed sandwiching the point light source in a width direction substantially orthogonal to the measurement direction. The two second light-receiving arrays are disposed substantially sandwiching the point light source in the measurement direction. The two third light-receiving arrays are configured to receive light reflected by the slit track comprising an incremental pattern that differs in pitch from other incremental patterns, and are disposed substantially sandwiching the point light source in the measurement direction between the two first light-receiving arrays.

According to another aspect of the disclosure, there is provided an encoder. The encoder comprises a plurality of slit tracks, means for emitting diffusion light to the plurality of slit tracks, means for outputting a signal representing a low-accuracy absolute position within one rotation, means for outputting a highly periodical repetition signal, and means for receiving light reflected by the slit track comprising an incremental pattern that differs in pitch from other incremental patterns. The plurality of slit tracks respectively comprises a plurality of reflection slits arranged along a measurement direction. The means for outputting a signal representing a low-accuracy absolute position is disposed in duplicate sandwiching the means for emitting the diffusion light in a width direction substantially orthogonal to the measurement direction. The means for outputting a highly periodical repetition signal is disposed in duplicate sandwiching the means for emitting the diffusion light in the measurement direction. The means for receiving light reflected by the slit track comprising an incremental pattern is disposed at a position in a direction where the means for outputting a signal representing the low-accuracy absolute position is disposed than the means for emitting the diffusion light.

DETAILED DESCRIPTION OF THE EMBODIMENTS

The following describes embodiments with reference to accompanying drawings.

Note that the encoder related to the respective embodiments described hereinafter is applicable to various types of encoders, such as a rotary type and a linear type. In the following, the embodiments are described using the rotary-type encoder as an example to ensure ease of encoder understanding. In a case where the embodiments are to be applied to another encoder type, it is possible to apply the type by adding appropriate changes, such as changing the object to be measured from a rotary-type disk to a linear scale, and thus detailed descriptions thereof are omitted.

Embodiment 1

1-1. Servo System

Figure 1:
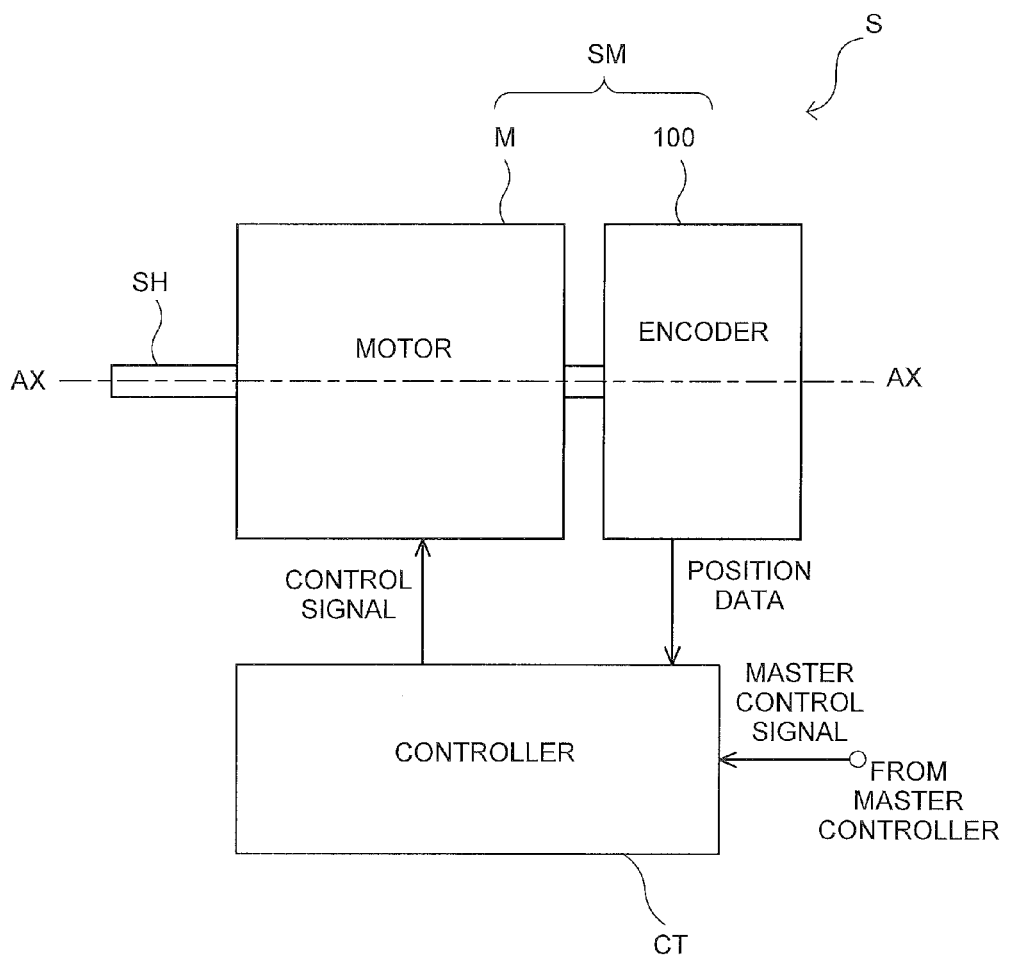
FIG. 1 is an explanatory view for explaining a servo system related to embodiment 1.

First, the configuration of a servo system related to this embodiment will be described with reference to FIG. 1. As shown in FIG. 1, the servo system S comprises a servo motor SM and a controller CT. The servo motor SM comprises an encoder 100 and a motor M.

The motor M is an example of a power generation source not including the encoder 100. The motor M is a rotary-type motor in which a rotor (not shown) rotates with respect to a stator (not shown), and outputs a rotational force by rotating a shaft SH fixed to the rotor around an axis AX.

Further, the motor M alone is sometimes referred to as a servo motor, but, in this embodiment, the configuration including the encoder 100 is referred to as the servo motor SM. That is, the servo motor SM corresponds to one example of a motor with an encoder. The following, for convenience of explanation, describes a case where the motor with an encoder is a servo motor controlled so as to follow target values, such as position and velocity values, but the motor is not necessarily limited to a servo motor. In a case where the output of the encoder is used for display only, for example, the motor with an encoder also includes motors used in a system other than a servo system, as long as an encoder is attached.

The motor M is not particularly limited as long as it is a motor in which the encoder 100 is capable of detecting position data and the like, for example. Further, the motor M is not limited to an electric motor that uses electricity as a power source, and it may be a motor that uses, for example, another power source, such as a hydraulic motor, a pneumatic motor, and a steam motor. However, for convenience of explanation, the following describes a case where the motor M is an electric motor.

The encoder 100 is connected to the side opposite the rotational force output side of the shaft SH of the motor M. Note that the connected side is not necessarily limited to the opposite side, allowing the encoder 100 to be connected to the rotational force output side of the shaft SH. The encoder 100 detects a position of the motor M (also referred to as a rotational angle) by detecting the position of the shaft SH (rotor), and outputs position data representing the position.

The encoder 100 may detect at least one of a velocity of the motor M (also referred to as rotation speed, angular velocity, and the like) and an acceleration of the motor M (also referred to as rotation acceleration, angular acceleration, and the like) in addition to or in place of the position of the motor M. In this case, the velocity and the acceleration of the motor M can be detected by, for example, obtaining the first derivative or the second derivative of the position with respect to time, or counting a detection signal (an incremental signal described later, for example) for a predetermined period of time. For convenience of explanation, the following describes the embodiment with the physical quantity detected by the encoder 100 as the position.

The controller CT acquires position data output from the encoder 100, and controls the rotation of the motor M based on the position data. Consequently, in this embodiment where an electric motor is used as the motor M, the controller CT controls the rotation of the motor M by controlling the current, voltage, or the like to be applied to the motor M based on position data. Furthermore, it is also possible for the controller CT to control the motor M by acquiring a master control signal from a master controller (not shown) so that a rotational force capable of achieving a position and the like represented by the master control signal is output from the shaft SH of the motor M. Note that, in a case where the motor M uses another power source, such as a hydraulic, pneumatic, or steam motor, it is possible for the controller CT to control the rotation of the motor M by controlling the supply of the power source.

1-2. Encoder

Figure 2:
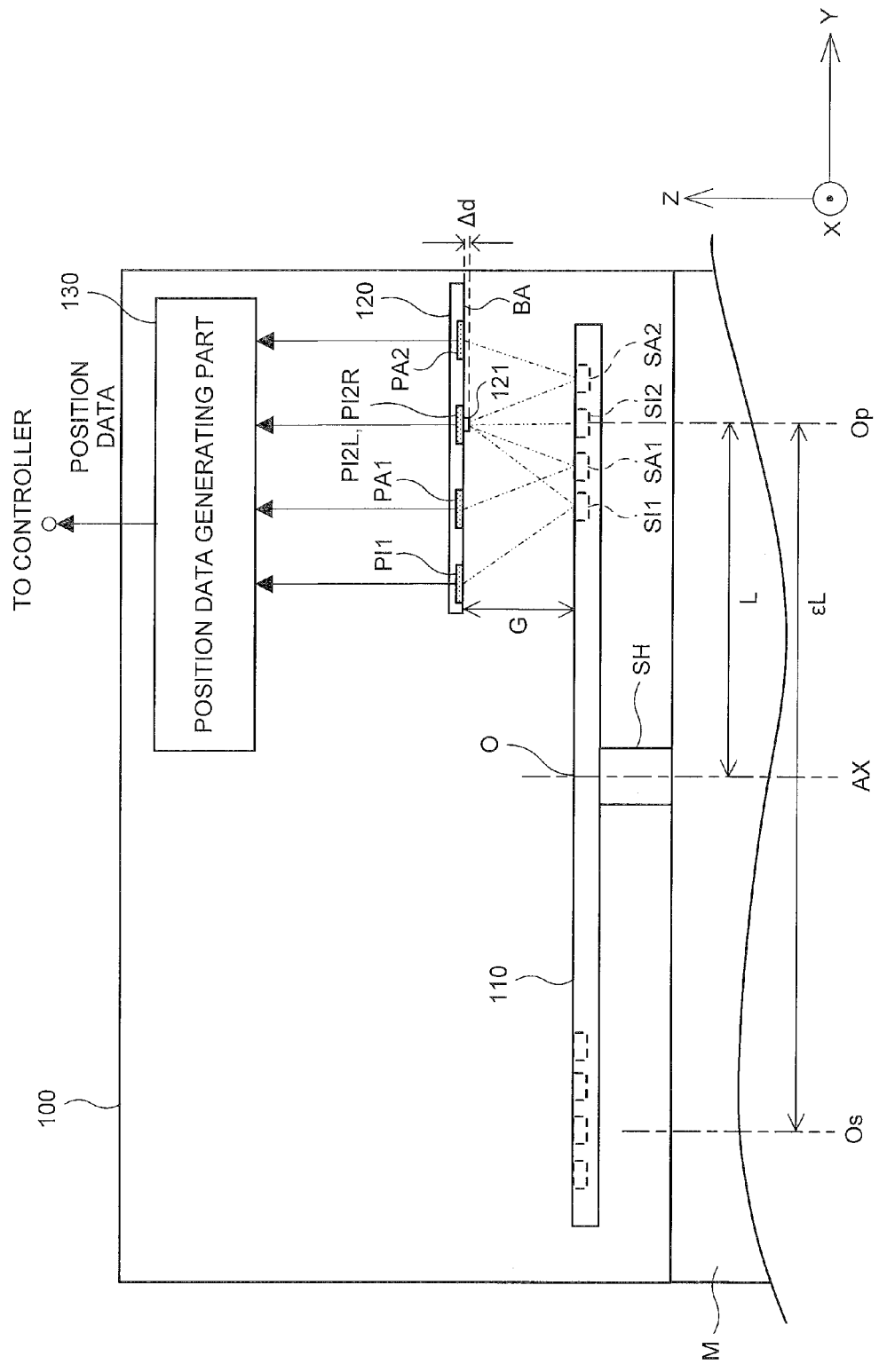
FIG. 2 is an explanatory view for explaining an encoder related to embodiment 1.

Next, the encoder 100 related to this embodiment will be described. As shown in FIG. 2, the encoder 100 comprises a disk 110, an optical module 120, and a position data generating part 130.

Here, for convenience of explanation of a structure of the encoder 100, directions, such as upward and downward directions, are defined and suitably used as follows. In FIG. 2, the direction in which the disk 110 faces the optical module 120, that is, the positive direction along the Z axis, is referred to as "upward" and the negative direction along the Z axis is referred to as "downward." Note that the directions vary according to the attachment mode of the encoder 100, and the positional relationship of each configuration of the encoder 100 is not limited.

1-2-1. Disk

Figure 3:
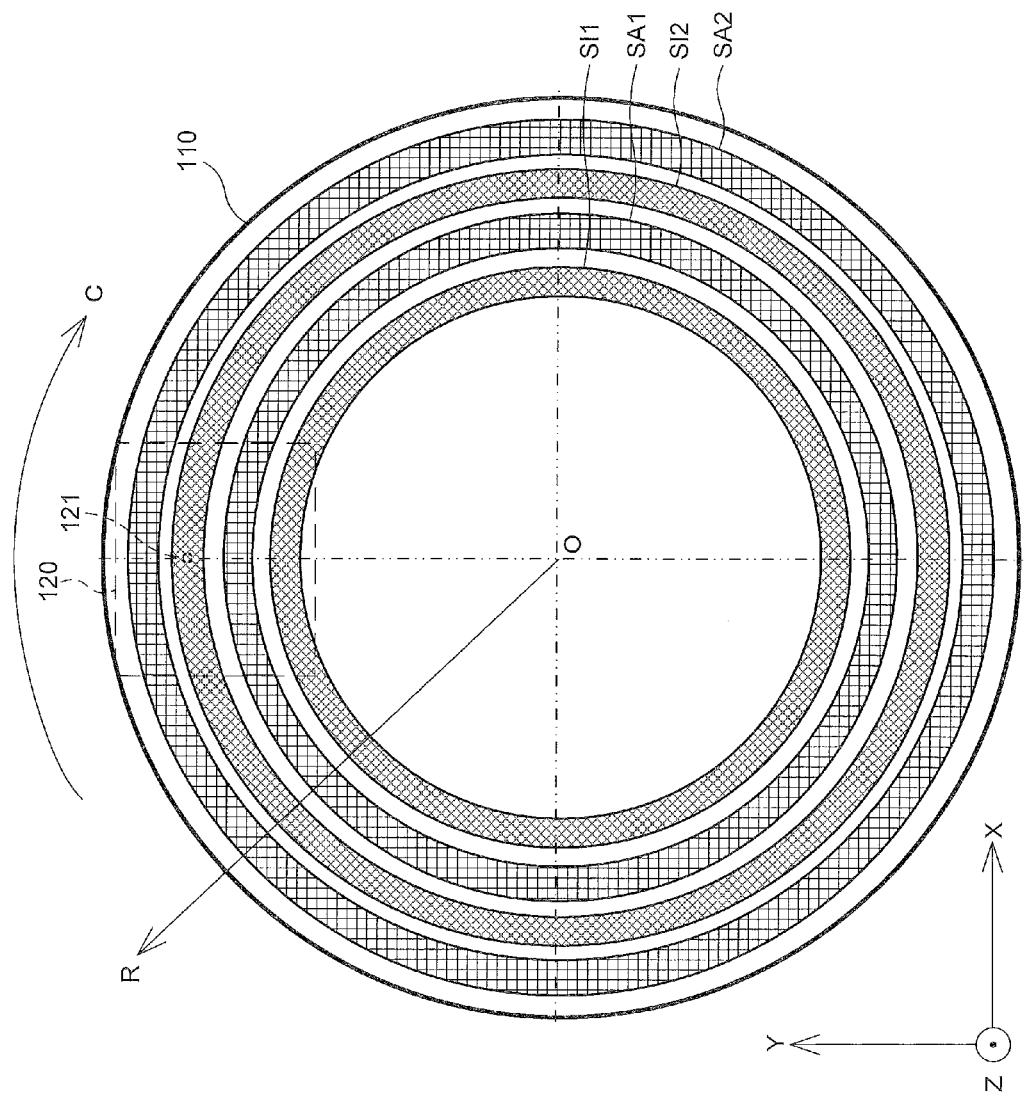
FIG. 3 is an explanatory view for explaining a disk related to embodiment 1.

The disk 110 is formed into the shape of a circular plate as shown in FIG. 3, and disposed so that a disk center O substantially agrees with the axis AX. The disk 110 is connected to the shaft SH of the motor M, and rotates by the rotation of the shaft SH. Note that, in this embodiment, explanation is given with the disk 110 in the shape of a circular plate as an example of an object to be measured that measures the rotation of the motor M. However, it is also possible to use another member, such as an end surface of the shaft SH, for example, as an object to be measured. Further, while the disk 110 is directly connected to the shaft SH in the example shown in FIG. 2, the disk 110 may be connected via a connecting member such as a hub.

As shown in FIG. 3, the disk 110 comprises a plurality of slit tracks SA1, SA2, SI1, SI2. While the disk 110 rotates with the drive of the motor M, the optical module 120 is disposed fixedly while facing a portion of the disk 110. Consequently, the slit tracks SA1, SA2, SI1, SI2 and the optical module 120 move relatively to each other in the measurement direction (the direction of arrow C shown in FIG. 3; hereinafter suitably referred to as "measurement direction C") as the motor M is driven.

Here, the "measurement direction" is the measurement direction when the respective slit tracks formed on the disk 110 by the optical module 120 are optically measured. In a rotary-type encoder in which the object to be measured is the disk 110 as in this embodiment, the measurement direction agrees with the circumferential direction with the center axis of the disk 110 as its center, but is the direction along a linear scale in a linear-type encoder in which the object to be measured is a linear scale and a mover moves with respect to a stator. Note that the "center axis" is the rotational axis of the disk 110, and agrees with the axis AX of the shaft SH in a case where the disk 110 and the shaft SH are coaxially connected.

1-2-2. Optical Detecting Mechanism

The optical detecting mechanism comprises the slit tracks SA1, SA2, SI1, SI2 and the optical module 120. The respective slit tracks are formed as tracks disposed in a ring shape with the disk center O as its center on the upper surface of the disk 110. Each of the slit tracks comprises a plurality of reflection slits (the sections shaded by slashes in FIG. 4) arranged side by side across the entire circumference of the track along the measurement direction C. Each reflection slit reflects light irradiated from a light source 121. Note that the light source 121 corresponds to one example of means for emitting diffusion light.

1-2-2-1. Disk

The disk 110 is formed by a material that reflects light, such as metal, for example. Then, a material with low reflectance (such as chromium oxide, for example) is disposed onto sections where light is not to be reflected on the surface of the disk 110 by a coating process or the like, thereby forming reflection slits in sections where the material is not disposed. Note that the reflection slits may also be formed by creating a coarse surface on the sections where light is not to be reflected by sputtering or the like, thereby reducing reflectance.

Further, the material, manufacturing method, and the like of the disk 110 are not particularly limited. For example, the disk 110 may be formed using a material that transmits light, such as glass or transparent resin. In this case, the reflection slits can be formed by disposing a material that reflects light (such as aluminium, for example) on the surface of the disk 110 by vapour deposition or the like.

Four slit tracks are arranged on the upper surface of the disk 110 in the width direction (the direction of arrow R shown in FIG. 3; hereinafter suitably referred to as "width direction R"). Note that the "width direction" is the radial direction of the disk 110, i.e., the direction substantially orthogonal to the measurement direction C, and the length of each slit track along this width direction R corresponds to the width of each slit track. The four slit tracks are concentrically disposed in the order of slit tracks SI1, SA1, SI2, SA2, from the inside toward the outside in the width direction R. In order to explain the respective slit tracks in further detail, FIG. 4 shows a partially enlarged view of the vicinity of an area of the disk 110 facing the optical module 120.

Figure 4:
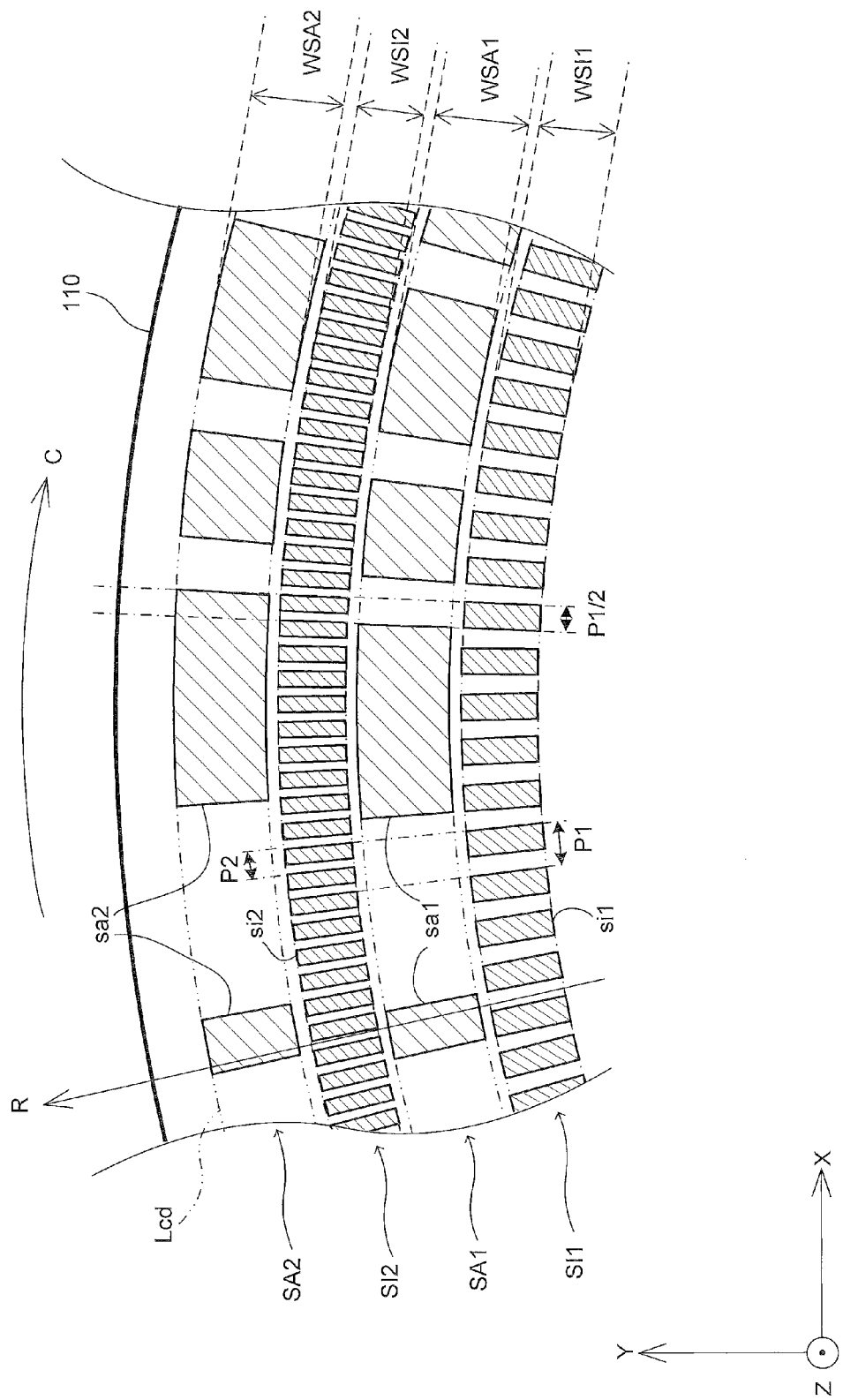
FIG. 4 is an explanatory view for explaining a slit track related to embodiment 1.

As shown in FIG. 4, a plurality of reflection slits sa1, sa2, respectively included in the slit tracks SA1, SA2, is disposed along the entire circumference of the disk 110 so as to comprise an absolute pattern in the measurement direction C.

Note that the "absolute pattern" is a pattern in which the positions, proportions, and the like of the reflection slits within an angle in which the light-receiving arrays of the optical module 120 described later face each other are uniquely defined within one rotation of the disk 110. That is, for example, if the motor M is in a certain angular position in the case of the example of the absolute pattern shown in FIG. 4, a combination of bit patterns resulting from detection or non-detection by each of the plurality of light-receiving elements of the light-receiving arrays facing each other uniquely represents the absolute position of the angular position. Note that the "absolute position" refers to an angular position with respect to the origin within one rotation of the disk 110. The origin is set in a suitable angular position within one rotation of the disk 110, and the absolute pattern is formed with this origin as a reference.

Note that, according to an example of this pattern, it is possible to generate a pattern that one-dimensionally represents the absolute position of the motor M by bits in the number of light-receiving elements of the light-receiving array. However, the absolute pattern is not limited to this example. For example, the pattern may be a pattern multi-dimensionally represented by bits in the number of light-receiving elements. Further, other than a predetermined bit pattern, the pattern may be a pattern in which a physical quantity, such as a phase or amount of light received by the light-receiving elements, changes so as to uniquely represent the absolute position, a pattern in which a code sequence of an absolute pattern modulates, or other various patterns.

Note that, according to this embodiment, the same absolute patterns are offset from each other by, for example, a length equivalent to one-half of one bit in the measurement direction C, forming the two slit tracks SA1, SA2. This offset amount is a value corresponding to, for example, half a pitch P1 of a reflection slit si1 of the slit track SI1. If the slit tracks SA1, SA2 were not configured to be offset in this manner, possibilities such as the following exist. That is, if the absolute position is represented by a one-dimensional absolute pattern such as in this embodiment, the detection accuracy of the absolute position may decrease in the area of a change in the bit pattern resulting from the respective light-receiving elements of the light-receiving arrays PA1, PA2 being positioned facing the vicinity of an end area of the reflection slits. According to this embodiment, since the slit tracks SA1, SA2 are offset, the absolute position is calculated using the detection signal from the slit track SA2 or the opposite operation is performed when, for example, the absolute position by the slit track SA1 corresponds to a change point in the bit pattern. As a result, it is possible to improve the detection accuracy of the absolute position. Note that, while the amount of received light in the two light-receiving arrays PA1, PA2 needs to be uniform in the case of such a configuration, the two light-receiving arrays PA1, PA2 are disposed equidistant from the light source 121 according to this embodiment, making it possible to achieve the above described configuration.

Note that, instead of offsetting the respective absolute patterns of the slit tracks SA1, SA2 against each other, the light-receiving arrays PA1, PA2 respectively corresponding to the slit tracks SA1, SA2 may be offset against each other without offsetting the absolute patterns, for example.

On the other hand, a plurality of reflection slits si1, si2 respectively included in the slit tracks SI1, SI2 is disposed along the entire circumference of the disk 110 so as to comprise an incremental pattern in the measurement direction C.

The "incremental pattern" is a pattern repeated regularly at a predetermined pitch, as shown in FIG. 4. Here, "pitch" refers to the disposed interval of the respective reflection slits si1, si2 of the slit tracks SI1, SI2 that comprise an incremental pattern. As shown in FIG. 4, the pitch of the slit track SI1 is P1, and the pitch of the slit track SI2 is P2. The incremental pattern, unlike the absolute pattern that represents the absolute position by the bits corresponding to detection or non-detection by the plurality of light-receiving elements, represents the position of the motor M for each pitch or within one pitch by the sum of the detection signals resulting from at least one or more of the light-receiving elements. Consequently, the incremental pattern does not represent the absolute position of the motor M, but can represent the position with very high accuracy compared to the absolute pattern.

According to this embodiment, the pitch P1 of the slit track SI1 is set longer than the pitch P2 of the slit track SI2. According to this embodiment, each pitch is set so that P1=2× P2. That is, the number of reflection slits si2 of the slit track SI2 is two times the number of the reflection slits si1 of the slit track SI1. Nevertheless, the relationship of this slit pitch is not limited to this example, and can take various values, such as three times, four times, and five times, for example.

Note that, according to this embodiment, the minimum length of the reflection slits sa1, sa2 of the slit tracks SA1, SA2 in the measurement direction C agrees with the pitch P1 of the reflection slit si1 of the slit track SI1. As a result, the resolution of the absolute signal based on the slit tracks SA1, SA2 agrees with the number of the reflection slits si1 of the slit track SI1. Nevertheless, the minimum length is not limited to this example, and the number of the reflection slits si1 of the slit track SI1 is preferably set greater than or equal to the resolution of the absolute signal.

1-2-2-2. Optical Module

Figure 5:
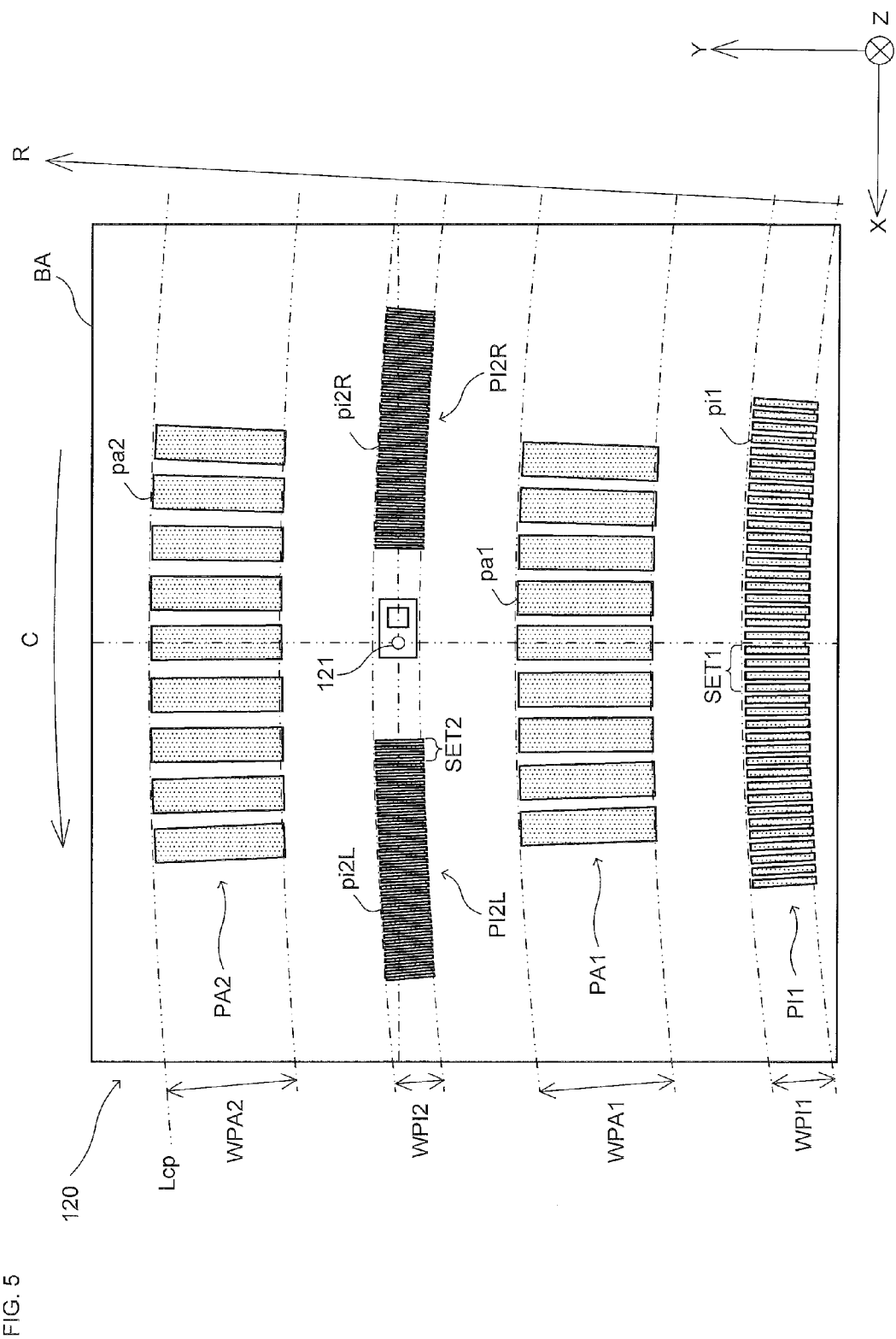
FIG. 5 is an explanatory view for explaining an optical module and a light-receiving array related to embodiment 1.

The optical module 120, as shown in FIG. 2 and FIG. 5, is formed as one substrate BA parallel to the disk 110. With this arrangement, the encoder 100 can be thinned and the structure of the optical module 120 can be simplified. Consequently, the optical module 120 relatively moves with respect to the slit tracks SA1, SA2, SI1, SI2 in the measurement direction C, accompanying the rotation of the disk 110. Note that the optical module 120 does not necessarily need to be configured as one substrate BA, allowing each component to be configured as a plurality of substrates. In this case, these substrates may be collectively disposed. Further, the optical module 120 does not need to be in the form of a substrate.

The optical module 120, as shown in FIG. 2 and FIG. 5, comprises the light source 121, and a plurality of light-receiving arrays PA1, PA2, PI1, PI2L, PI2R on the surface of the substrate BA facing the disk 110.

As shown in FIG. 3, the light source 121 is disposed in a position facing the slit track SI2. Then, the light source 121 emits light onto the sections facing the four slit tracks SA1, SA2, SI1, SI2 that pass through the positions facing the optical module 120.

The light source 121 is not particularly limited as long as it is a light source capable of irradiating the irradiation area with light, allowing use of a light emitting diode (LED), for example. The light source 121 is particularly configured as a point light source in which no optical lens or the like is disposed, and emits diffusion light from a light-emitting part. Note that, when referring to a "point light source," the light source does not need to be strictly a point, and the light may be emitted from a finite emission surface as long as the light source is regarded as capable of emitting diffusion light from a substantially point-like position from the standpoint of design and operation principles. Further, the "diffusion light" is not limited to light emitted from a point light source toward all directions, but includes light that is diffused and emitted toward a certain finite direction. That is, the term "diffusion light" used here includes any light that comprises more diffusibility than parallel light. By using a point light source in this manner, it is possible for the light source 121 to substantially uniformly irradiate the four slit tracks SA1, SA2, SI1, SI2 that pass through the positions facing thereto with light. Further, collecting and diffusing of light by an optical element are not performed, and therefore errors and the like caused by the optical element are unlikely to occur, making it possible to increase the straightness of light toward the slit tracks.

The plurality of the light-receiving arrays PA1, PA2, PI1, PI2L, PI2R is disposed along the circumference of the light source 121, and comprises a plurality of light-receiving elements pa1, pa2, pi1, pi2L, pi2R (the sections shaded by dots in FIG. 5), each which receives light reflected by the reflection slits of the slit tracks correspondingly associated thereto. The plurality of light-receiving elements is arranged side by side along the measurement direction C, as shown in FIG. 5.

Note that the light emitted from the light source 121 is diffusion light. Consequently, the image of the slit tracks projected onto the optical module 120 is an image magnified by a predetermined magnifying power E in accordance with the optical path length. That is, as shown in FIG. 4 and FIG. 5, given WSA1, WSA2, WSI1, WSI2 as the respective lengths of the slit tracks SA1, SA2, SI1, SI2 in the width direction R and WPA1, WPA2, WPI1, WPI2 as the lengths of the shapes of the reflection light projected onto the optical module 120 in the width direction R, WPA1, WPA2, WPI1, WPI2 are lengths corresponding to E times WSA1, WSA2, WSI1, WSI2. Note that this embodiment shows an example in which the lengths of the light-receiving elements of the respective light-receiving arrays in the width direction R are set substantially equal to the shape of the respective slits projected onto the optical module 120, as shown in FIG. 5. However, the lengths of the light-receiving elements in the width direction R are not necessarily limited to this example.

Similarly, the measurement direction C in the optical module 120 is also the shape of the measurement direction C in the disk 110 projected onto the optical module 120, that is, the shape affected by the magnifying power E. In order to make understanding easier, the following provides a detailed explanation using the measurement direction C in the position of the light source 121 as an example, as shown in FIG. 2. The measurement direction C in the disk 110 is circular in shape, with the axis AX as a center. Conversely, the center of the measurement direction C projected onto the optical module 120 is located in a position separated from an optical center Op, which is in a position within the plane of the disk 110 on which the light source 121 is disposed, by a distance ϵL. The distance ϵL is a distance L between the axis AX and optical center Op magnified by the magnifying power ϵ. This position is conceptually illustrated in FIG. 2 as a measurement center Os. Consequently, the measurement direction C in the optical module 120 is on a line having the measurement center Os separated by the distance ϵL from the optical center Op on a line on which the optical center Op and the axis AX are located in the direction of the axis AX as a center and the distance ϵL as a radius.

In FIG. 4 and FIG. 5, the correspondence relationship of the measurement direction C in the disk 110 and the optical module 120 is represented by arc-shaped lines Lcd, Lcp. The line Lcd shown in FIG. 4 represents a line on the disk 110 along the measurement direction C, and the line LCP shown in FIG. 5 represents a line on the substrate BA along the measurement direction C (the line Lcd projected onto the optical module 120).

As shown in FIG. 2, given G as a gap length between the optical module 120 and the disk 110, and Δd as an amount of protrusion of the light source 121 from the substrate BA, the magnifying power ϵ is expressed by the following (Formula 1).

$$\epsilon = (2G - \Delta d)/(G - \Delta d) \qquad \text{(Formula 1)}$$

As each light-receiving element, a photodiode, for example, can be used. However, the light-receiving element is not limited to a photodiode and is not particularly limited as long as it is capable of receiving light emitted from the light source 121 and converting the light into an electric signal.

The light-receiving arrays PA1, PA2, PI1, PI2L, PI2R in this embodiment are disposed correspondingly to the four slit tracks SA1, SA2, SI1, SI2. The light-receiving array PA1 is configured to receive the light reflected by the slit track SA1, and the light-receiving array PA2 is configured to receive the light reflected by the slit track SA2. Further, the light-receiving array PI1 is configured to receive the light reflected by the slit track SI1, and the light-receiving arrays PI2L, PI2R are configured to receive the light reflected by the slit track SI2. While the light-receiving arrays PI2L, PI2R are divided in the middle, they correspond to the same track. In this manner, the number of light-receiving arrays corresponding to one slit track is not limited to one, allowing a plurality.

The light source 121, the light-receiving arrays PA1, PA2, and the light-receiving arrays PI1, PI2L, PI2R are disposed in the positional relationship shown in FIG. 5. The light-receiving arrays PA1, PA2 corresponding to the absolute pattern are disposed sandwiching the light source 121 in the width direction R. In this example, the light-receiving array PA1 is disposed on the inner circumference side, and the light-receiving array PA2 is disposed on the outer circumference side. According to this embodiment, the distances between the light-receiving arrays PA1, PA2 and the light source 121 are substantially equal. Then, the plurality of light-receiving elements included in the light-receiving arrays PA1, PA2 is arranged side by side at a certain pitch along the measurement direction C (the line Lcp). The light-receiving arrays PA1, PA2 respectively receive the reflection light from the slit tracks SA1, SA2, thereby generating an absolute signal comprising a bit pattern in the number of light-receiving elements. Note that the light-receiving arrays PA1, PA2 correspond to one example of the first light-receiving array, and one example of means for outputting a signal that represents a low-accuracy absolute position within one rotation.

The light-receiving array PI1 corresponding to the incremental pattern is disposed on the center axis side with respect to the light source 121 so as to sandwich the light-receiving array PA1 with the light source 121, in the disposed direction of the light-receiving array PA1 with the light source 121 as the center. Further, the light-receiving arrays PI2L, PI2R corresponding to the incremental pattern are disposed sandwiching the light source 121 in the measurement direction C. Specifically, the light-receiving arrays PI2L, PI2R are axisymmetrically disposed with a line parallel to the Y axis, which includes the light source 121, serving as the axis of symmetry, and each of the light-receiving arrays PA1, PA2, PI1 form an axisymmetrical shape about the above described symmetrical axis. The light source 121 is disposed between the light-receiving arrays PI2L, PI2R disposed as one track in the measurement direction C. Note that the light-receiving arrays PI2L, PI2R correspond to one example of the second light-receiving arrays, and also to one example of means for outputting a highly periodical repetition signal. Further, the light-receiving array PI1 corresponds to one example of the third light-receiving array, and also to one example of means for receiving light reflected by the slit track comprising an incremental pattern that differs in pitch from other incremental patterns.

This embodiment illustrates a one-dimensional pattern as the absolute pattern, and therefore the light-receiving arrays PA1, PA2 corresponding thereto comprise a plurality (nine, for example, in this embodiment) of light-receiving elements pa1, pa2 arranged side by side along the measurement direction C (line Lcp) so as to respectively receive the light reflected by the reflection slits sa1, sa2 of the slit tracks SA1, SA2 correspondingly associated thereto. This plurality of light-receiving elements pa1, pa2 handles whether or not light is received as a bit as described above, and represents the absolute position of nine bits in total. Consequently, a light reception signal received by each of the plurality of light-receiving elements pa1, pa2 is handled independently in the position data generating part 130, and the absolute position encrypted (coded) into a serial bit pattern is decoded from the combination of these light reception signals. The light reception signal of the light-receiving arrays PA1, PA2 is referred to as an "absolute signal." Note that, in a case where an absolute pattern that differs from that in this embodiment is used, the light-receiving arrays PA1, PA2 become a configuration corresponding to that pattern.

The light-receiving arrays PI1, PI2L, PI2R comprise a plurality of light-receiving elements arranged side by side along the measurement direction C (line Lcp) so as to respectively receive light reflected by the reflection slits si1, si2 of the slit tracks SI1, SI2 correspondingly associated thereto. First, the light-receiving array is explained using the light-receiving array PI1 as an example.

According to this embodiment, sets of a total of four light-receiving elements pi1 (represented by "SET1" in FIG. 5) are arranged side by side in one pitch (one pitch in the projected image; that is, ϵ×P1) of the incremental pattern of the slit track SI1, and sets of the four light-receiving elements pi1 are further arranged side by side in a plurality along the measurement direction C. Then, since the incremental pattern forms reflection slits repeatedly on a per pitch basis, each of the light-receiving elements pi1 generates a periodic signal of one period (referred to as 360° in terms of electric angle) in one pitch when the disk 110 rotates. Then, since four light-receiving elements pi1 are disposed in one set corresponding to one pitch, the light-receiving elements adjacent to each other in one set detect periodic signals comprising a phase difference of 90° from each other. The respective light reception signals are referred to as an A-phase signal, a B-phase signal (with a phase difference of 90° from the A-phase signal), a bar A-phase signal (with a phase difference of 180° from the A-phase signal), and a bar B-phase signal (with a phase difference of 180° from the B-phase signal).

The incremental pattern represents a position in one pitch, and therefore the signal in each phase in one set and the signal in each phase in another set corresponding thereto have values that change in the same manner. Consequently, the signals in the same phase are added across a plurality of sets. Consequently, from a large number of light-receiving elements pi1 of the light-receiving array PI1 shown in FIG. 5, four signals shifted from one another by a phase of 90° are detected.

On the other hand, the light-receiving arrays PI2L, PI2R are also configured in the same manner as the light-receiving array PI1. That is, sets of a total of four light-receiving elements pi2L, pi2R (represented by "SET2" in FIG. 5) are arranged side by side in one pitch (one pitch in the projected image; that is, ϵ×P2) of the incremental pattern of the slit track SI2, and sets of four light-receiving elements Pi2L, pi2R are arranged side by side in a plurality along the measurement direction C. Consequently, four signals shifted from one another by a phase of 90° are respectively generated from the light-receiving arrays PI1, PI2L, PI2R. These four signals are referred to as "incremental signals." Further, the incremental signals generated from the light-receiving arrays PI2L, PI2R corresponding to the slit track SI2 with a short pitch are referred to as "high incremental signals" since the resolution is high compared to other incremental signals, and the incremental signals generated by the light-receiving array PI1 corresponding to the slit track SI1 with a long pitch are referred to as "low incremental signals" since the resolution is low compared to other incremental signals.

Note that while this embodiment describes an illustrative scenario in which four light-receiving elements are included in one set corresponding to one pitch of the incremental pattern, and the light-receiving array PI2L and the light-receiving array PI2R each comprise sets with the same configuration, the number of light-receiving elements in one set is not particularly limited, such as a case where two light-receiving elements are included in one set, for example. Further, the light-receiving arrays PI2L, PI2R may be configured to acquire light reception signals in different phases.

1-2-3. Position Data Generating Part

The position data generating part 130 acquires two absolute signals, each comprising the bit pattern representing the absolute position, and high incremental signals and low incremental signals that include four signals shifted from one another by a phase of 90°, from the optical module 120, at the timing in which the absolute position of the motor M is measured. Then, based on the acquired signals, the position data generating part 130 calculates the absolute position of the motor M represented by these signals, and outputs position data representing the calculated absolute position to the controller CT.

Note that, as for the method for generating the position data by the position data generating part 130, various methods can be used without particular limitation. As an example, the following describes a case where the absolute position is calculated from the high incremental signal and the low incremental signal as well as the absolute signal, and the position data is then generated.

Figure 6:
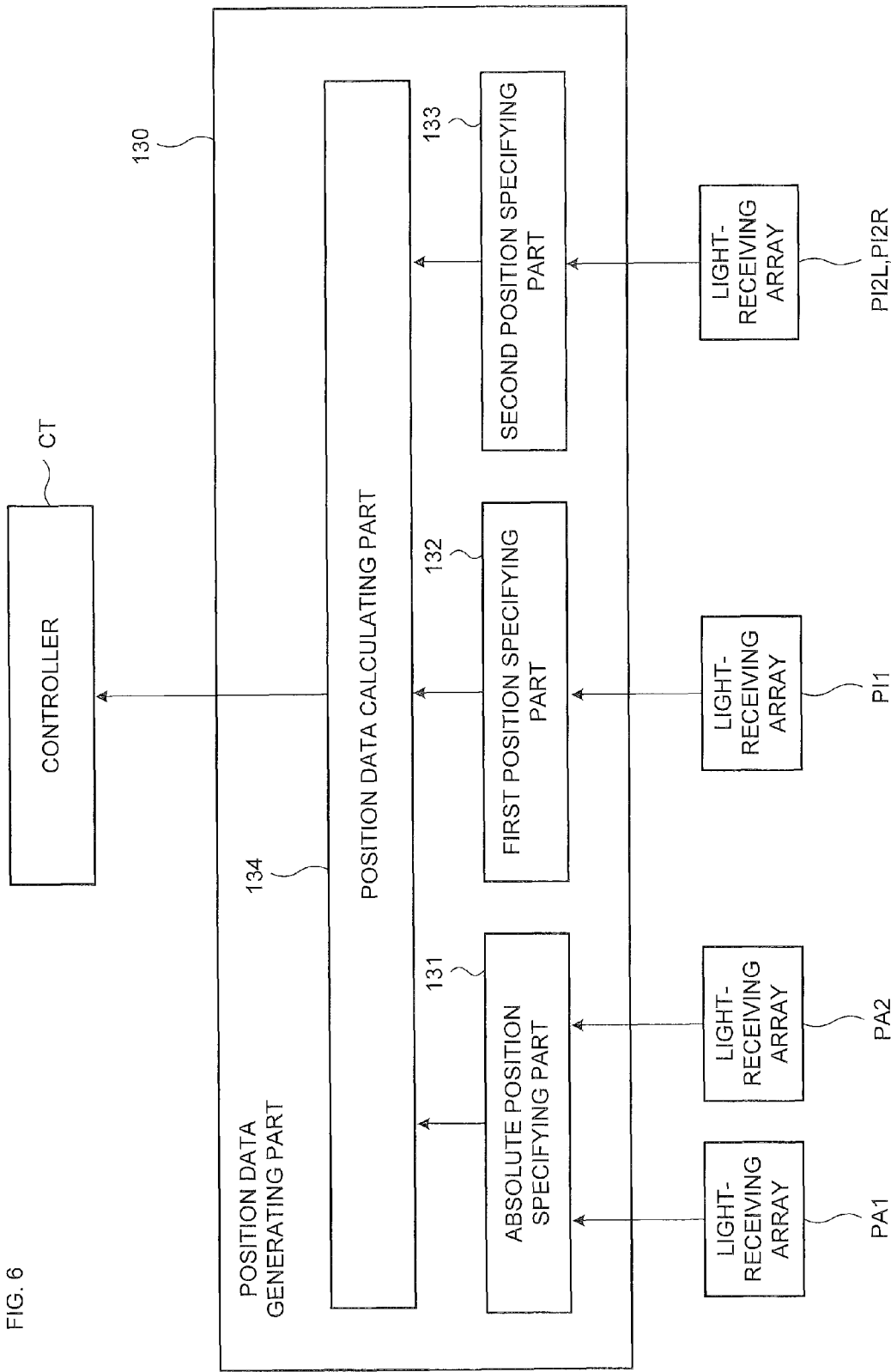
FIG. 6 is an explanatory view for explaining a position data generating part related to embodiment 1.

As shown in FIG. 6, the position data generating part 130 comprises an absolute position specifying part 131, a first position specifying part 132, a second position specifying part 133, and a position data calculating part 134. The absolute position specifying part 131 binarises each absolute signal from the light-receiving arrays PA1, PA2, and converts the signals into bit data representing the absolute position. Then, the absolute position specifying part 131 specifies the absolute position based on the correspondence relationship between predefined bit data and the absolute position.

On the other hand, of the low incremental signals of the respective four phases from the light-receiving array PI1, the first position specifying part 132 subtracts the low incremental signals with a phase difference of 180° from each other. By subtracting the signals with a phase difference of 180°, it is possible to cancel out the manufacturing errors, measurement errors, and the like of the reflection slit within one pitch. As described above, the signals resulting from the subtraction are referred to as a "first incremental signal" and a "second incremental signal" here. The first incremental signal and the second incremental signal comprise a phase difference of 90° from each other by electric angle (simply referred to as "A-phase signal," "B-phase signal," and the like). Then, the first position specifying part 132 specifies a position within one pitch from these two signals. The method for specifying a position within one pitch is not particularly limited. For example, in a case where the low incremental signal, which is a periodic signal, is a sinusoidal signal, an example of the above described specification method is to calculate an electric angle $\phi$ by performing the arc tangent operation on the result of division of the two sinusoidal signals in the A phase and B phase. Or, there is also a method for converting the two sinusoidal signals into an electric angle $\phi$ using a tracking circuit. Or, there is also a method for specifying an electric angle $\phi$ correspondingly associated with the values of signals in the A phase and B phase in a table created in advance. At this time, it is preferable for the first position specifying part 132 to convert the two sinusoidal signals in the A phase and B phase from analogue to digital on a per detection signal basis.

The position data calculating part 134 superimposes the position within one pitch specified by the first position specifying part 132 onto the absolute position specified by the absolute position specifying part 131. With this arrangement, it is possible to calculate an absolute position with higher resolution than an absolute position based on an absolute signal. According to this embodiment, the resolution of this calculated absolute position agrees with the number of slits of the slit track SI2 with a short pitch. That is, in this example, the resolution of the calculated absolute position is two times the resolution of an absolute position based on an absolute signal.

On the other hand, the second position specifying part 133 performs the same processing as the aforementioned first position specifying part 132 on the high incremental signals from the light-receiving arrays PI2L, PI2R, and specifies a highly accurate position within one pitch from the two signals. Then, the position data calculating part 134 superimposes the position within one pitch specified by the second position specifying part 133 onto the absolute position calculated based on the aforementioned low incremental signals. With this arrangement, it is possible to calculate an absolute position that has even higher resolution than the absolute position calculated based on low incremental signals.

The position data calculating part 134 performs multiplication processing on the absolute position thus calculated to further improve the resolution, and outputs the result as position data representing a highly accurate absolute position to the controller CT. The method for specifying a high resolution absolute position from a plurality of position data with different resolutions in this manner is referred to as the "stacking-up method."

1-3. Examples of Advantages of Embodiment 1

According to this embodiment, a plurality of slit tracks include the slit track SI1 which comprises an incremental pattern that differs in pitch from other incremental patterns, and the light-receiving array PI1 is configured to receive the light reflected by the slit track SI1. That is, the encoder 100 comprises a plurality of types of slit tracks SI2, SI1, each comprising an incremental pattern that differs in pitch, and a plurality of light-receiving arrays PI2L, PI2R, PI1 configured to receive the light therefrom. With this arrangement, it is possible to generate position data representing an absolute position with high resolution by the aforementioned stacking-up method, making it possible to achieve high resolution.

Further, according to this embodiment, the light-receiving array PI1 is disposed so as to sandwich the light-receiving array PA1 with the light source 121, making it possible to achieve higher accuracy in addition to the aforementioned higher resolution. Note that to "achieve higher accuracy" refers to increasing the reliability of the detection signal by reducing noise and the like.

Generally, with the light-receiving array disposed away from the light source, the amount of received light is reduced. When the light-receiving surface area is increased in order to maintain the amount of received light, the junction capacitance of the respective light-receiving elements increases, decreasing signal responsiveness. Further, if the amount of received light is reduced, signal responsiveness similarly decreases even if the gain is increased on the circuit side.

On the other hand, in a case where a configuration is adopted in which the light-receiving array PI1 is disposed in a position away from the light source 121, sandwiching another light-receiving array as in this embodiment, it is possible to suppress such a responsiveness reduction effect to a minimum. That is, because the signals acquired from the light-receiving arrays PI2L, PI2R have high resolution, the signals become highly periodic repetition signals compared to those of other light-receiving arrays, but the accuracy of the final absolute position is relatively highly affected by the responsiveness of the signals output from the light-receiving arrays PI2L, PI2R. Consequently, the disposed positions of the light-receiving arrays PI2L, PI2R are important factors in accuracy improvement. Further, the signals output from the light-receiving arrays PA1, PA2 represent a relatively low-accuracy absolute position within one rotation, as described above. These output signals also serve as the foundation of the final absolute position, and therefore precision and responsiveness are required for accuracy improvement. Consequently, the disposed positions of the light-receiving arrays PA1, PA2 also serve as important factors in accuracy improvement.

On the other hand, in a case where three types of light-receiving arrays (an example of the first to third light-receiving arrays) are disposed as in this embodiment, it becomes difficult to dispose all of the types of light-receiving arrays adjacent to the light source 121, and at least one type of light-receiving array sandwiches another light-receiving array with the light source 121. Based on such circumstances, according to this embodiment, the light-receiving array PI1 is disposed sandwiching another light-receiving array with the light source 121. As a result, it is possible to arrange the light-receiving arrays PI2L, PI2R and the light-receiving arrays PA1, PA2, which have a relatively large effect on the accuracy of the absolute position, near the light source 121, making it possible to improve responsiveness and, further, the accuracy of the absolute position.

Further, according to this embodiment, the light-receiving arrays PI2L, PI2R sandwich the light source 121 in the measurement direction, and the light-receiving arrays PA1, PA2 sandwich the light source 121 in the width direction. With such a configuration, it is possible to arrange the light-receiving arrays PI2L PI2R, the responsiveness of which relatively highly affects accuracy, near the light source 121 to the extent possible, regardless of the distance restricted by slit width and reflection. Consequently, accuracy can be further improved.

Note that, in this embodiment, the stacking-up method is further adopted as described above and the resolution of the signal in the light-receiving array PI1 is lower than the resolutions of the signals in the light-receiving arrays PI2L, PI2R, making the responsiveness of the signals required in the light-receiving array PI1 relatively low (in other words, the permissible range of the responsiveness of the signals more extensive). As a result, a responsiveness effect is unlikely, making it possible to further improve accuracy. That is, the light-receiving arrays PI2L, PI2R with a high signal resolution can be disposed near the light source 121, making it possible to secure high signal responsiveness.

On the one hand, a portion of the reflection light from the slit tracks may be reflected on the surface of each light-receiving element included in each light-receiving array. When this reflection light is reflected by the slit tracks once again and received by another light-receiving array, crosstalk occurs, causing noise. Then, in a case where a plurality of light-receiving arrays is disposed along the circumference of the light source 121 as in this embodiment, the light emitted from the light source 121 is diffusion light and therefore the light reflected on the surface of the light-emitting array and reflected once again by the slit track is received in relatively large amounts by the light-receiving array disposed on the outside of that light-receiving array (the side opposite the light source 121). As a result, in a case where there is a light-receiving array disposed sandwiching another light-receiving array with the light source 121 as in this embodiment, the light-receiving array receives reflection components by the light-receiving array nearer the light source 121, possibly producing even greater noise. On the other hand, in a case where there is not another light-receiving array between the light-receiving array and the light source 121, the effect of the reflection components by the light-receiving array decreases.

Consequently, by disposing the light-receiving array PI1 in a position where it sandwiches another light-receiving array with the light source 121 as in this embodiment, the light-receiving arrays PI2L, PI2R and the light-receiving arrays PA1, PA2, which have a relatively large noise effect, can be disposed so that another light-receiving array does not exist between them and the light source 121. This makes it possible to reduce the noise resulting from the reflection components of the light-receiving arrays and improve accuracy.

Figure 7:
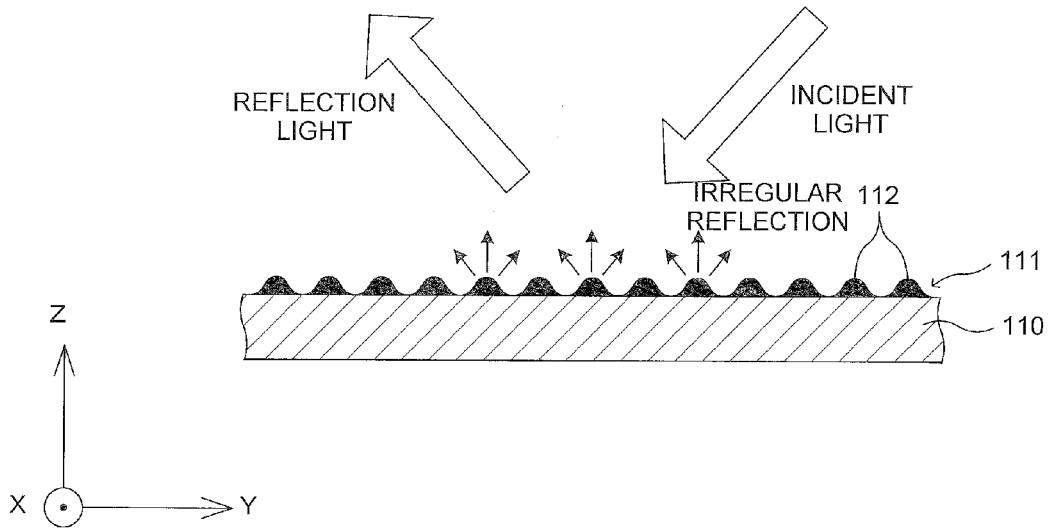
FIG. 7 is an explanatory view for explaining an irregular reflection caused by an unevenness of the disk surface related to embodiment 1.

On the other hand, as shown in FIG. 7, a large amount of minute unevenness exists on the surface of a material 111 of the disk 110, which causes the light emitted from the light source 121 to produce irregular reflection (scattering) when reflected by the disk 110.

Figure 8:
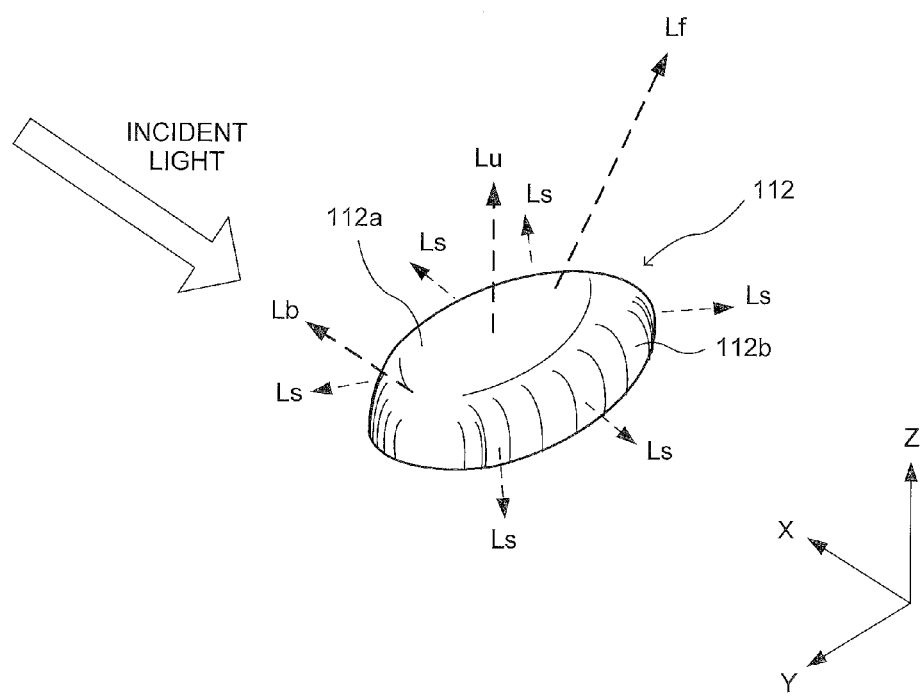
FIG. 8 is an explanatory view for explaining a directivity of the irregular reflection components caused by convex parts.

FIG. 8 conceptually shows an example of the shape of a convex part 112 in the minute unevenness of the material 111.

Note that, in FIG. 8, the length of each arrow of the irregular reflection component represents the size of intensity. In the example shown in FIG. 8, the convex part 112 comprises an upper surface 112a, and an inclined side surface 112b that surrounds the circumference of the upper surface 112a. The upper surface 112a, with its relatively flat shape, has a large surface area where the incident light is irradiated diagonally from above (the positive side along the Y axis and the positive side along the Z axis in this example), but the side surface 112b, being slanted, has a small surface area where the incident light is irradiated. As a result, the intensity of the irregular reflection component produced by the incident light is relatively high for a frontward scattering component Lf, an upward scattering component Lu, and a rearward scattering component Lb scattered by the upper surface 112a, and relatively low for a sideways scattering component Ls scattered by the side surface 112b in the circumferential direction, as shown in FIG. 8. Further, of the frontward scattering component Lf, the upward scattering component Lu, and the rearward scattering component Lb, the intensity of the frontward scattering component Lf scattered in the regular reflection direction is highest, and the intensity of upward scattering component Lu scattered upward and the rearward scattering component Lb scattered in the direction reverse from the advancing direction of the incident light is intermediate (higher than the sideways scattering component Ls). Consequently, the distribution of the irregular reflection components as a whole is dominant in the direction along the Y-Z plane.

Figure 9:
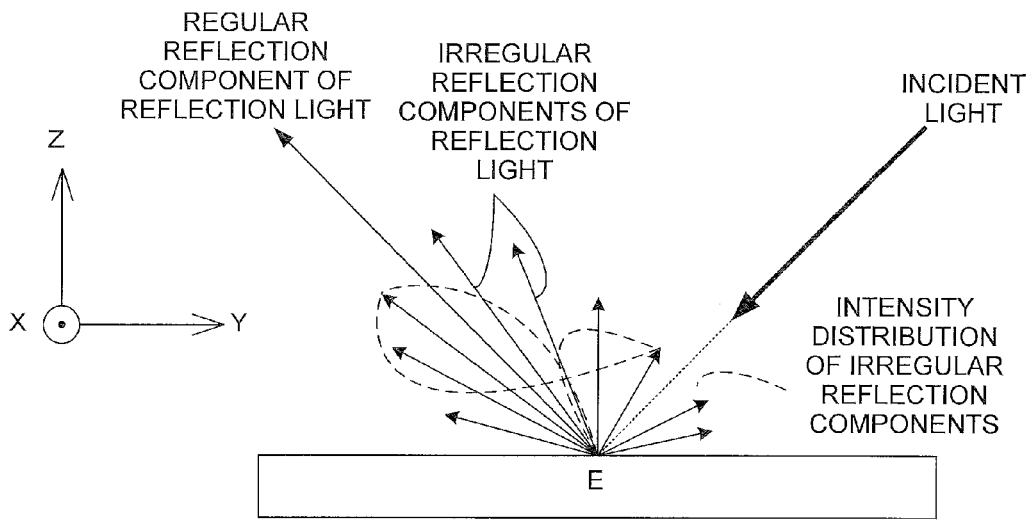
FIG. 9 is an explanatory view for explaining an intensity distribution of the irregular reflection components as viewed from a positive direction along an X axis.
Figure 10:
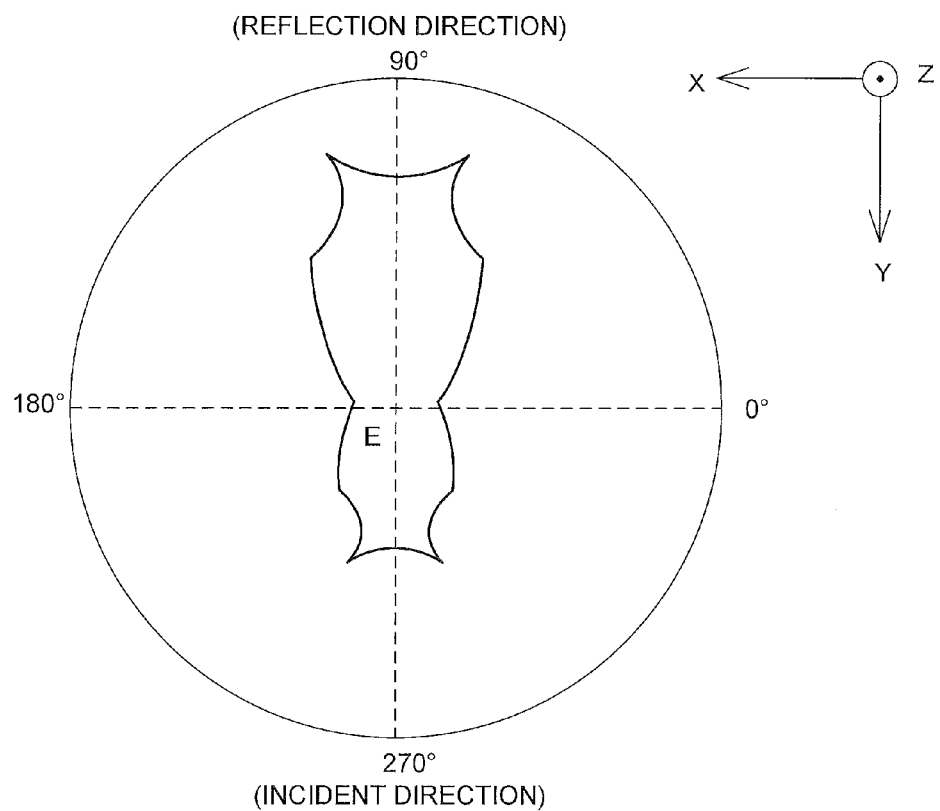
FIG. 10 is an explanatory view for explaining an intensity distribution of the irregular reflection components as viewed from a positive direction along a Z axis.

FIG. 9 shows the intensity distribution of the irregular reflection components as viewed from the positive direction along the X axis, and FIG. 10 shows the intensity distribution of the irregular reflection components as viewed from the positive direction along the Z axis. Note that the length of each arrow in FIG. 9 and the distance from point E in FIG. 10 represent the size of intensity, respectively. Due to the irregular reflection by the aforementioned convex part 112, the intensity distribution of the irregular reflection components on the surface of the disk 110 where a large number of minute convex parts 112 exists forms a shape that is longer in the direction along the plane which includes the advancing direction of the light (the Y-Z plane in this example), and comprises directivity in the direction along the Y axis as a whole, as shown in FIG. 9 and FIG. 10. More specifically, as shown in FIG. 10, this intensity distribution of the irregular reflection components is a substantially 8-shaped distribution wherein two circles arranged side by side in the advancing direction of the light are connected, with the reflection position E as the center, and the circle on the advancing direction far side of the light in particular forms a distribution shape that is larger than the circle on the advancing direction near side. That is, in a case where two light-receiving arrays are disposed in the same direction with respect to the light source 121 in the optical module 120, crosstalk in which, for example, the scattered light in the reflection light that should reach one light-receiving array reaches the other light-receiving array, occurs between both light-receiving arrays, causing noise. Then, the light-receiving array that is farther away from the light source 121 receives a greater amount of irregular reflection components of the light than the light-receiving array that is closer to the light source 121, sometimes producing even greater noise.

On the other hand, the extent of the effect of the noise of the light-receiving array PI1 on final accuracy is small, and the light-receiving array PI1 is an incremental light-receiving array with a relatively high resistance to noise. Consequently, the noise of the light-receiving arrays with a relatively large noise effect can be reduced and accuracy can be improved by disposing the light-receiving array PI1 in a position where it sandwiches another light-receiving array with the light source 121, as in this embodiment.

Further, while both the light-receiving arrays PI1, PI2 receive the reflection light of the incremental pattern, both reflection lights are repetition lights repeated periodically. If the noise of one repetition light were superimposed onto the other repetition light, both lights would interfere with each other, producing even greater noise. On the other hand, the reflection light received by the light-receiving arrays PA1, PA2 is reflection light from the absolute pattern, and therefore either does not have such a repetition period or has a relatively long period. Consequently, the noise that depends on such an absolute pattern does not readily interfere with the short cycle repetition light from the incremental pattern.

According to the configuration in this embodiment, the noise superimposed onto the light-receiving array PI1 is absolute pattern dependent. Consequently, it is possible to significantly suppress any increase in noise resulting from irregular reflection light interfering with the reflection light to be received by the light-receiving array PI1 disposed in a position where the noise is relatively superimposed, or the like. Thus, the configuration in this embodiment is extremely advantageous in a case where interference by noise needs to be suppressed.

Furthermore, according to this embodiment, the light-receiving arrays PI2L, PI2R wherein the noise affects accuracy relatively easily can be disposed in a direction that differs from those of other light-receiving arrays with respect to the light source 121. Consequently, the amount of light of the irregular reflection itself that reaches the light-receiving arrays PI2L, PI2R is reduced, making it possible to further improve accuracy.

Further, as described above, in the two light-receiving arrays PA1, PA2 that output absolute signals, a bit pattern resulting from detection or non-detection by each of the plurality of light-receiving elements uniquely represents an absolute position. On the other hand, in the light-receiving arrays PI1, PI2 that output incremental signals, the detection signals resulting from the plurality of light-receiving elements corresponding in phase are added together to represent a position within one pitch. In terms of the properties of such signals, the light-receiving arrays PI1, PI2 require a relatively small amount of received light and, since the noise is averaged, have a relatively high resistance to noise, whereas the light-receiving arrays PA1, PA2 require an adequate amount of received light and have a relatively low resistance to noise.

Consequently, in a case where the amount of received light by the absolute is to be maintained and the noise effect on the absolute signal is to be suppressed, a configuration can be adopted in which the light-receiving arrays PA1, PA2 are disposed in positions closer to the light source 121 than the light-receiving array PI1, as in this embodiment. With this arrangement, it is possible to dispose the light-receiving arrays PA1, PA2 near the light source 121 and maintain the amount of received light. Further, of the light-receiving arrays disposed in the same direction with respect to the light source 121, while the light-receiving array that is farther away from the light source receives a greater amount of irregular reflection components of the light than the light-receiving array that is closer to the light source as described above, according to this embodiment, the light-receiving array PI1 having a high resistance to noise is disposed in a position away from the light source 121 in the same direction, and the light-receiving array PA1 having a low resistance to noise is disposed in a position near the light source 121, thereby making it possible to suppress the noise effect resulting from the aforementioned irregular reflection components to a minimum.

Further, the detection error resulting from the eccentricity of the disk 110 generally tends to be dependent on the radius of the slit track, increasing when the radius is small and decreasing when the radius is large. Consequently, in a case where the robustness with respect to the eccentricity of a high incremental signal is to be enhanced, a configuration can be adopted in which the light-receiving array PI1 is disposed on the center axis side with respect to the light source 121, as in this embodiment. With this arrangement, the light-receiving arrays PI2L, PI2R are disposed further on the side opposite the center axis than the light-receiving array PI1 (i.e., the outer circumference side), and the slit track SI2 with a short pitch (i.e., with many slits) is disposed on the outer circumference side on the disk 110, making it possible to increase the radius of the slit track SI2. As a result, the detection error resulting from the eccentricity of the light-receiving arrays PI2L, PI2R that output high incremental signals can be decreased, and the robustness with respect to eccentricity can be enhanced. Further, a larger pitch of the slit track SI2 with many slits can be maintained.

1-4. Modifications of Embodiment 1

The above has described in detail embodiment 1 while referring to accompanying drawings. Nevertheless, the spirit and the scope of the present invention set forth in the claims are not limited to the embodiment described above. The fact that various changes, modifications, and combinations can be extrapolated within the true spirit and scope will be apparent to persons with ordinary skill in the art affiliated with the embodiments. Consequently, any techniques resulting from these changes, modifications, and combinations are also naturally affiliated with the spirit and scope of the invention.

Figure 11:
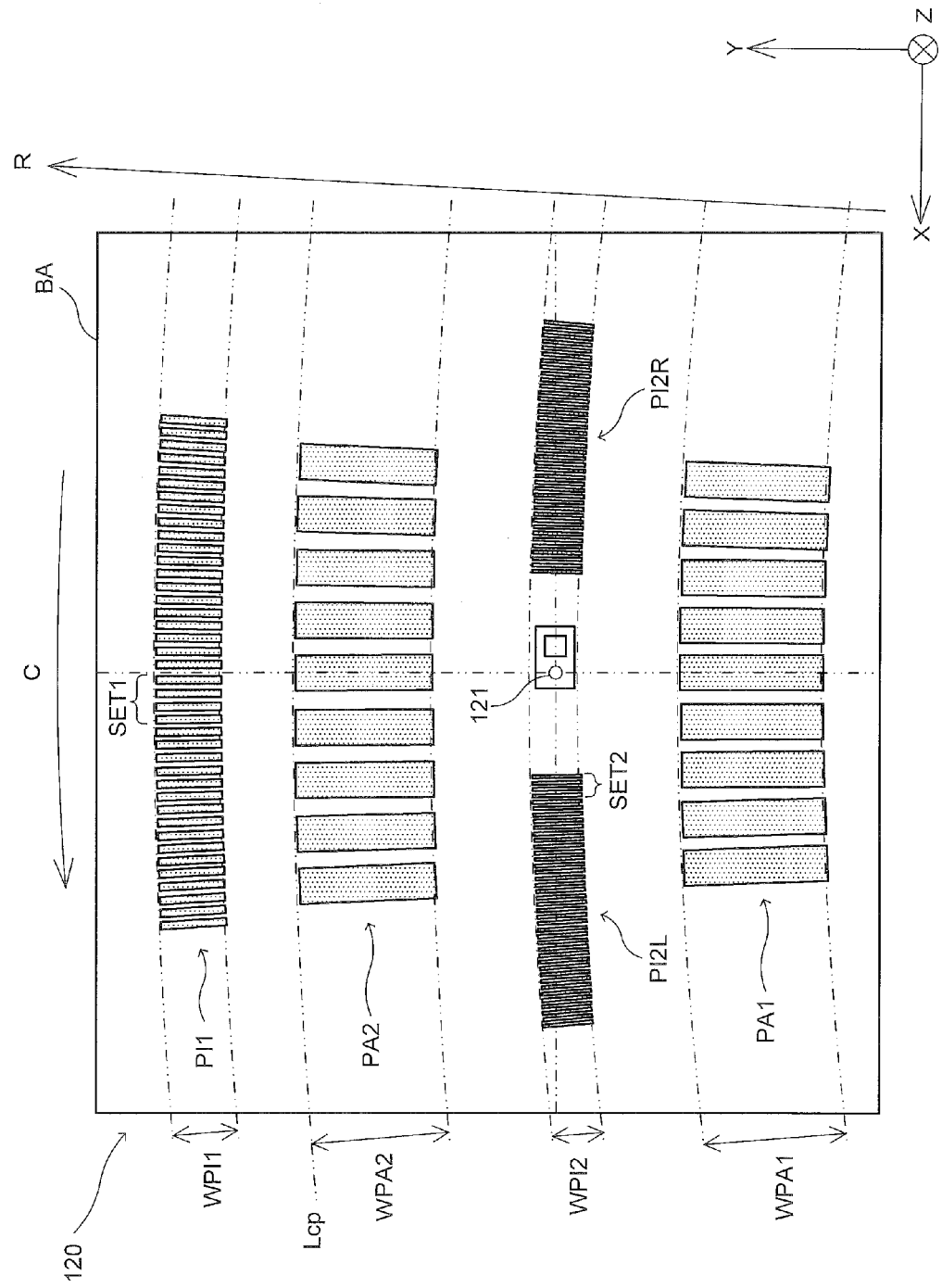
FIG. 11 is an explanatory view for explaining an optical module and a light-receiving array related to a modification of embodiment 1.

For example, while the above described embodiment has described an illustrative scenario in which the light-receiving array PI1 is disposed on the center axis side with respect to the light source 121, the light-receiving array PI1 may be disposed on the side opposite the center axis with respect to the light source 121 (the outer circumference side), as shown in FIG. 11, for example. Although not shown, in this case, the four slit tracks are disposed in the order of SA1, SI2, SA2, SI1, from the inside toward the outside in the width direction R on the disk 110. The configuration in the above described embodiment is preferably adopted in a case where the robustness with respect to the eccentricity of the high incremental signal is to be enhanced, and this configuration is preferably adopted in a case where the robustness with respect to the eccentricity of the low incremental signal is to be enhanced.

Embodiment 2

Next, embodiment 2 will be described. Note that the following mainly describes the sections that differ from embodiment 1; those sections that are the same as embodiment 1 are denoted using the same reference numerals and explanations thereof are suitably omitted.

2-1. Encoder

Next, the encoder 100 related to this embodiment will be described.

2-1-1. Optical Detecting Mechanism

Figure 12:
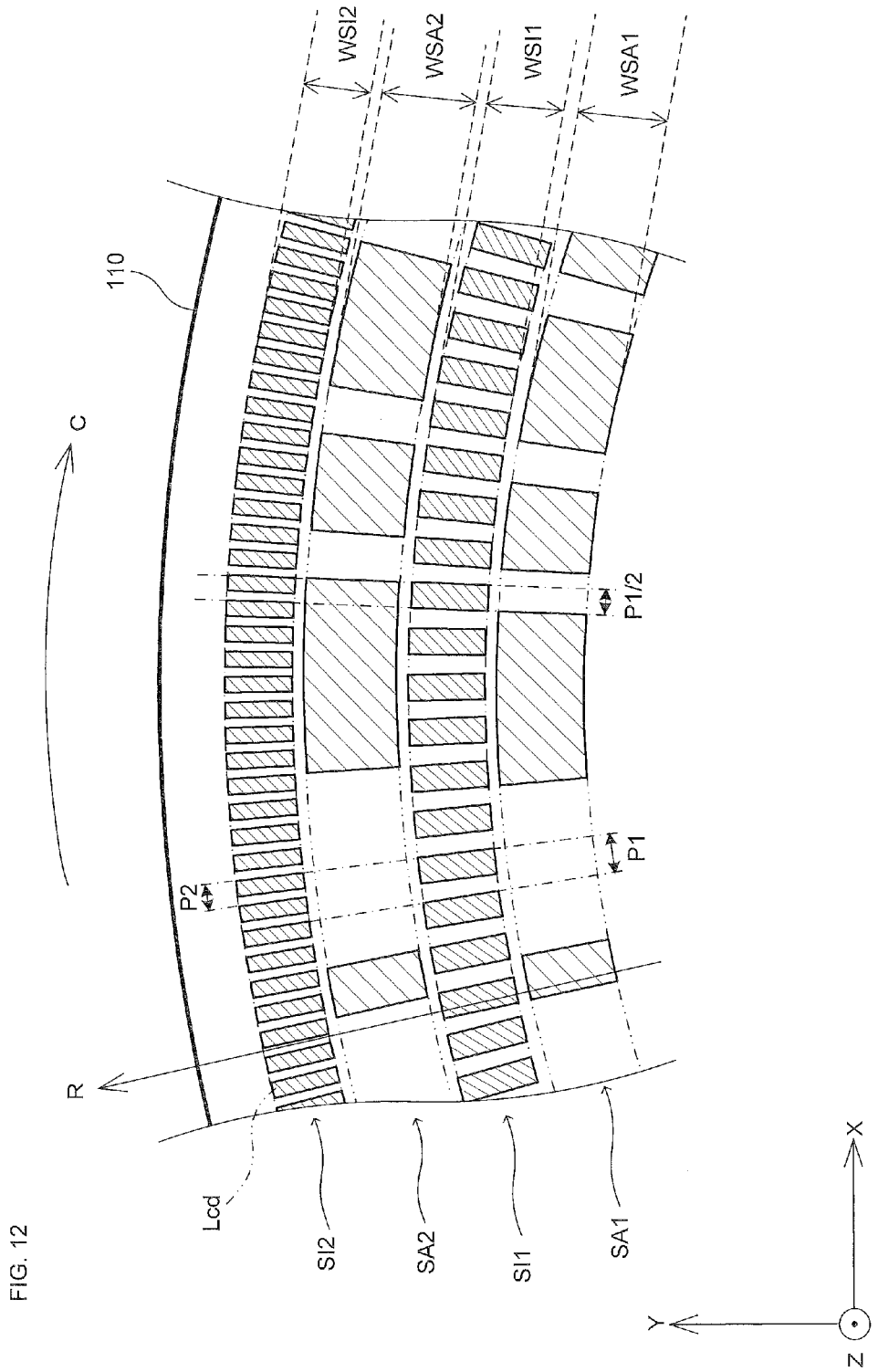
FIG. 12 is an explanatory view for explaining a slit track related to embodiment 2.

As shown in FIG. 12, the four slit tracks are concentrically disposed in the order of SA1, SI1, SA2, SI2, from the inside toward the outside in the width direction R on the disk 110. Further, the optical module 120, as shown in FIG. 13, comprises the light source 121, and the plurality of light-receiving arrays PA1, PA2, PI1L, PI1R, PI2 on the surface of the substrate BA facing the disk 110.

The light-receiving array PA1 is configured to receive the light reflected by the slit track SA1, and the light-receiving array PA2 is configured to receive the light reflected by the slit track SA2. Further, the light-receiving arrays PI1L, PI1R are configured to receive the light reflected by the slit track SI1, and the light-receiving array PI2 is configured to receive the light reflected by the slit track SI2. While the light-receiving arrays PI1L, PI1R are divided in the middle, they correspond to the same track.

Figure 13:
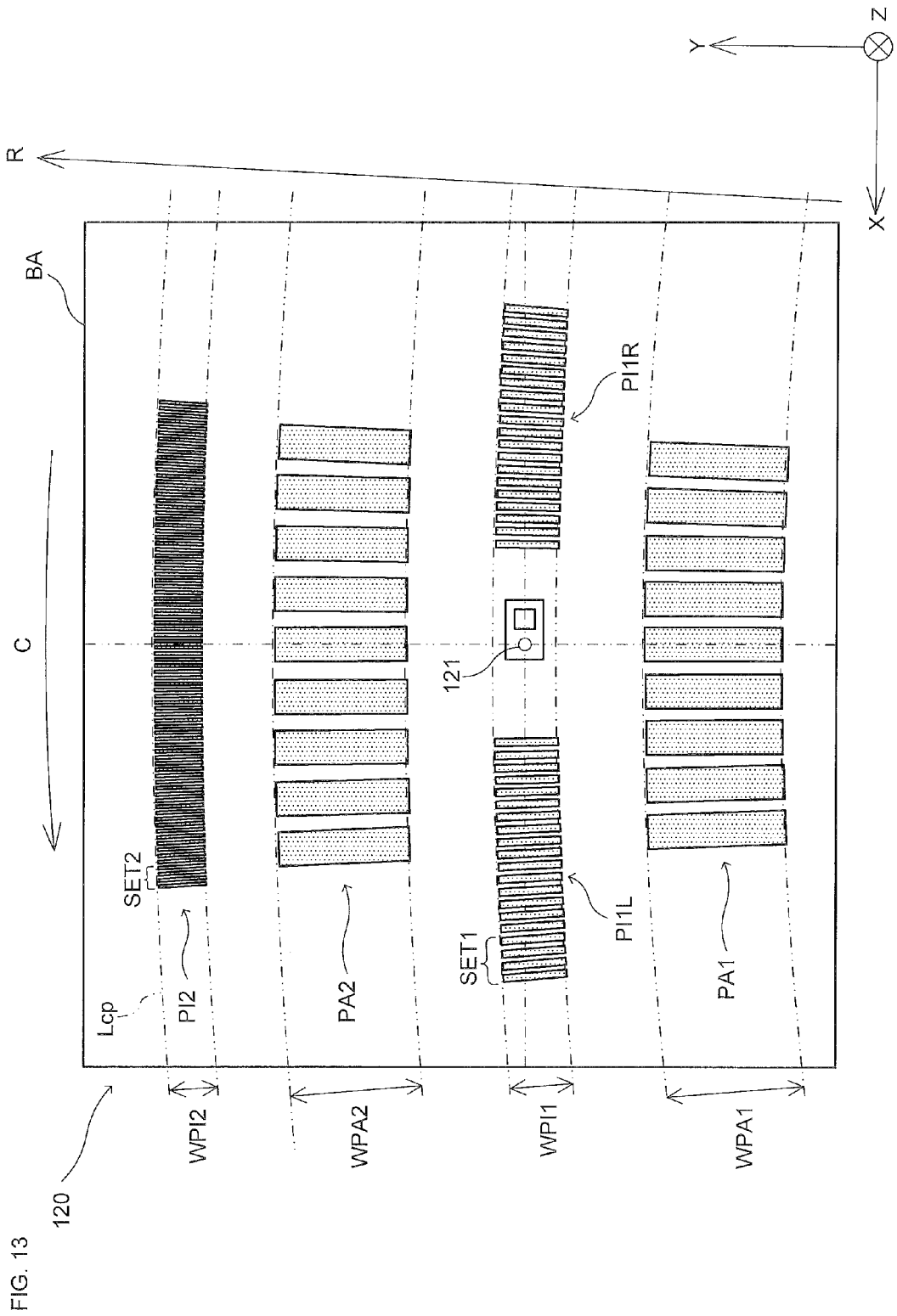
FIG. 13 is an explanatory view for explaining an optical module and a light-receiving array related to embodiment 2.

The light source 121, the light-receiving arrays PA1, PA2, and the light-receiving arrays PI1L, PI1R, PI2 are disposed in the positional relationship shown in FIG. 13. The light-receiving arrays PA1, PA2 corresponding to the absolute pattern are disposed sandwiching the light source 121 in the width direction R in the same manner as embodiment 1.

The light-receiving arrays PI1L, PI1R corresponding to the incremental pattern are disposed sandwiching the light source 121 in the measurement direction C. Further, the light-receiving array PI2 corresponding to the incremental pattern is disposed on the side opposite the center axis with respect to the light source 121 (the outer circumference side) so as to sandwich the light-receiving array PA2 with the light source 121, in the disposed direction of the light-receiving array PA2 with the light source 121 as the center. Specifically, the light-receiving arrays PI1L, PI1R are axisymmetrically disposed with a line parallel to the Y axis, which includes the light source 121, serving as the axis of symmetry, and each of the light-receiving arrays PA1, PA2, PI2 form an axisymmetrical shape about the above described symmetrical axis. The light source 121 is disposed between the light-receiving arrays PI1L, PI1R disposed as one track in the measurement direction C. Note that the light-receiving arrays PI1L, PI1R correspond to one example of the second light-receiving arrays, and also to one example of means for outputting a highly periodical repetition signal. Further, the light-receiving array PI2 corresponds to one example of the third light-receiving array, and also to one example of means for receiving light reflected by the slit track comprising an incremental pattern that differs in pitch from other incremental patterns.

Four incremental signals shifted from one another by a phase of 90° are respectively generated from the light-receiving arrays PI1L, PI1R, PI2. According to this embodiment, the incremental signals generated from the light-receiving array PI2 corresponding to the slit track SI2 with a short pitch are referred to as "high incremental signals" since the resolution is high compared to other incremental signals, and the incremental signals generated from the light-receiving array PI1L, PI1R corresponding to the slit track SI1 with a long pitch are referred to as "low incremental signals" since the resolution is low compared to other incremental signals.

2-1-2. Position Data Generating Part

Figure 14:
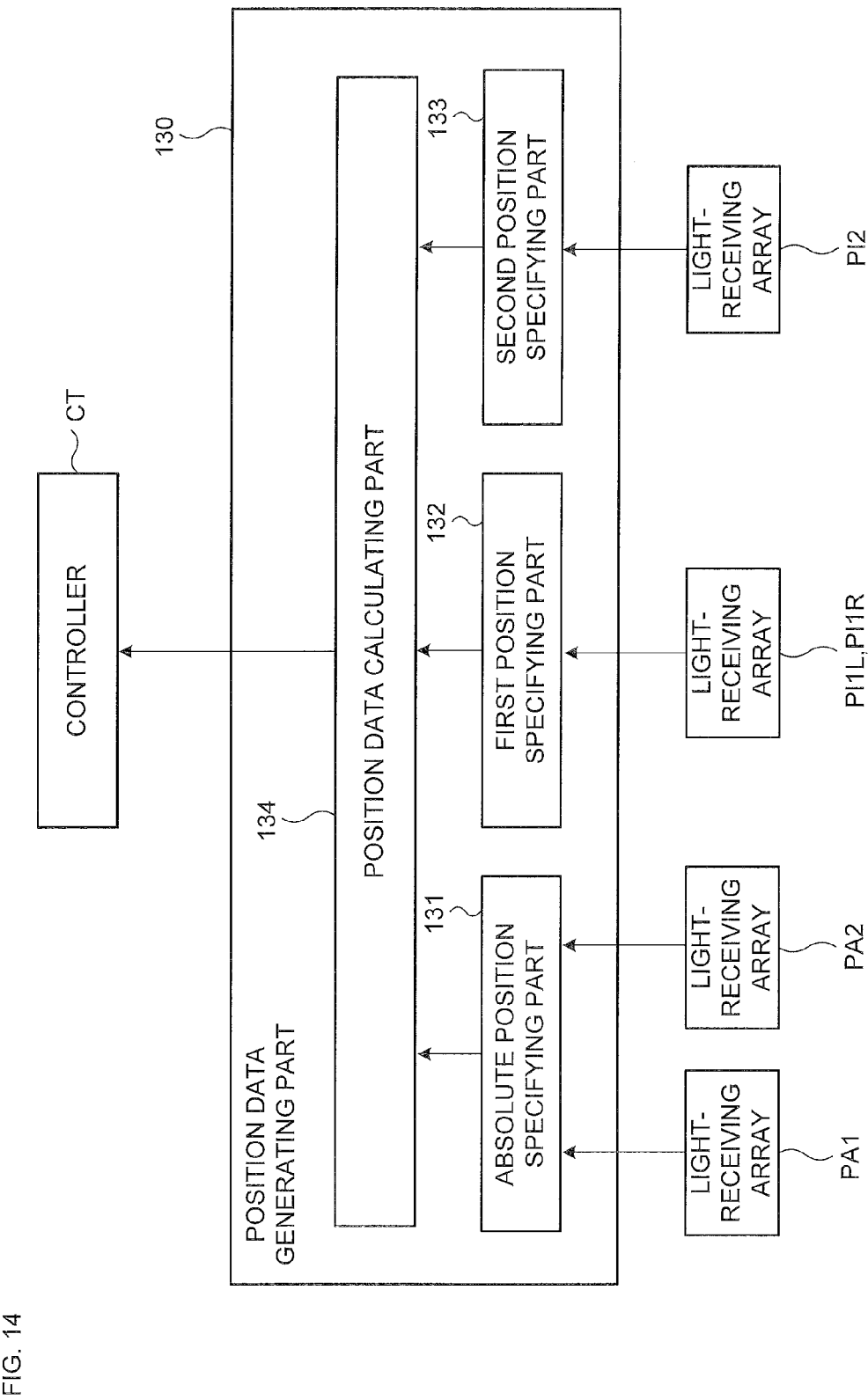
FIG. 14 is an explanatory view for explaining a position data generating part related to embodiment 2.

As shown in FIG. 14, according to this embodiment, of the low incremental signals of the respective four phases from the light-receiving arrays PI1L, PI1R, the first position specifying part 132 subtracts the low incremental signals with a phase difference of 180° from each other. The first position specifying part 132 specifies the position within one pitch from these two signals. The position data calculating part 134 superimposes the position within one pitch specified by the first position specifying part 132 onto the absolute position specified by the absolute position specifying part 131.

On the other hand, the second position specifying part 133 performs the same processing as the aforementioned first position specifying part 132 on the high incremental signals from the light-receiving array PI2, and specifies a highly accurate position within one pitch from the two signals. Then, the position data calculating part 134 superimposes the position within one pitch specified by the second position specifying part 133 onto the absolute position calculated based on the aforementioned low incremental signals.

The position data calculating part 134 performs multiplication processing on the absolute position thus calculated to further improve the resolution, and outputs the result as position data representing a highly accurate absolute position to the controller CT.

2-2. Examples of Advantages of Embodiment 2

According to this embodiment, similar to the aforementioned embodiment 1, it is possible to generate position data representing an absolute position with high resolution by the aforementioned stacking-up method, making it possible to achieve high resolution. Further, the light-receiving array PI2 is disposed so as to sandwich the light-receiving array PA2 with the light source 121, making it possible to achieve higher accuracy in addition to the aforementioned higher resolution. Note that to "achieve higher accuracy" here refers to increasing the reliability of the detection signal by improving robustness with respect to displacement and reducing noise, and the like.

Figure 15:
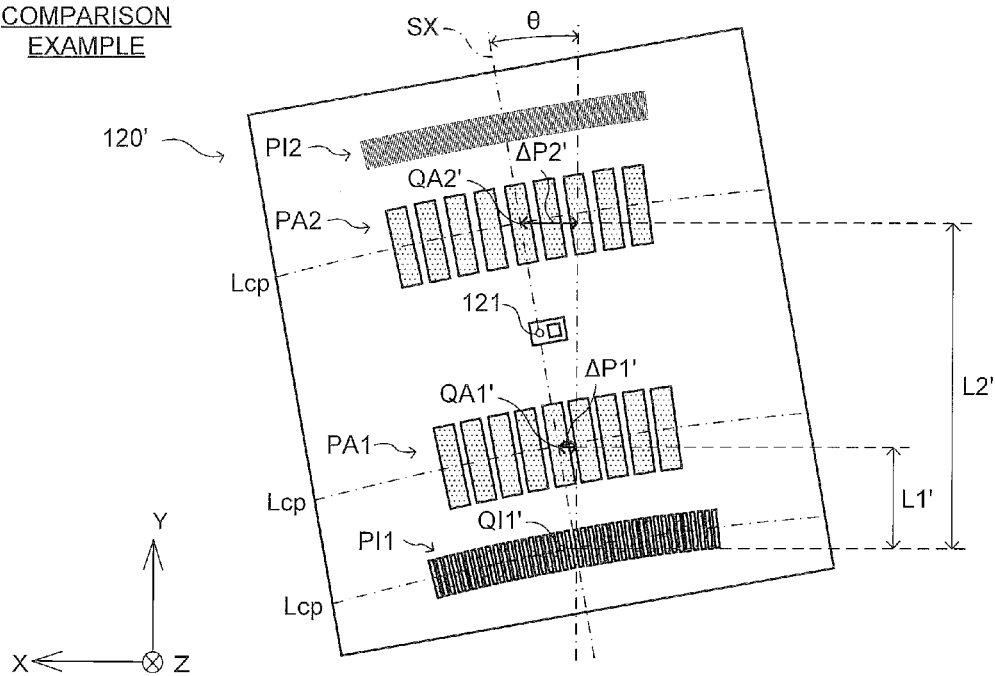
FIG. 15 is an explanatory view for explaining an optical module related to a comparison example with a shifted rotating direction.

According to this embodiment, it is possible to improve robustness with respect to displacement of the optical module 120 in the rotating direction. This advantage will now be described using the comparison example shown in FIG. 15. As shown in FIG. 15, in an optical module 120' related to the comparison example, the light-receiving array PI1 is disposed so as to sandwich the light-receiving array PA1 with the light source 121. That is, in the optical module 120' related to the comparison example, the light-receiving array PI1 is disposed on the outside of the absolute light-receiving arrays PA1, PA2 (the side opposite the light source 121), similar to the light-receiving array PI2. The light-receiving array PI1 corresponds to the light-receiving arrays PI1L, PI1R in embodiment 2, and is configured to receive light reflected by the slit track SI1 comprising the incremental pattern that is longer in pitch than other incremental patterns. The other configurations of the optical module 120' are the same as those of the optical module 120 related to embodiment 2.

FIG. 15 shows such the optical module 120' shifted by an angle θ in the rotating direction. Note that FIG. 15 shows the inclined angle exaggerated in size for ease of understanding (the same also holds true for FIG. 16 described later). Further, for convenience of explanation of displacement amounts, the rotation here is a rotation in which the line that passes through a center point QI1' of the light-receiving array PI1 (the point of intersection of the line Lcp that passes through the width direction center of the light-receiving array PI1 and the aforementioned axis SX of symmetry) and is parallel to the Z axis serves as the axis of rotation. The displacement amounts in the direction along the X axis of the light-receiving arrays PA1, PA2 in this state are ΔP1', ΔP2', respectively. Given L1' as the distance in the direction along the Y axis between the center point QI1' of the light-receiving array PI1 and a center point QA1' of the light-receiving array PA1 (the point of intersection of the line Lcp that passes through the width direction center of the light-receiving array PA1, and the axis SX of symmetry), and L2' as the distance in the direction along the Y axis between the center point QI1' of the light-receiving array PI1 and a center point QA2' of the light-receiving array PA2 (the point of intersection of the line Lcp that passes through the width direction center of the light-receiving array PA2, and the axis SX of symmetry), then ΔP1=L1' tan θ, ΔP2=L2' tan θ. That is, the displacement amounts of the light-receiving arrays PA1, PA2 in a case where the optical module 120' is displaced in the rotating direction increase in proportion to the distance from the light-receiving array PI1. As a result, the displacement amount ΔP2' of the light-receiving array PA2 is large compared to the displacement amount ΔP1' of the light-receiving array PA1, sometimes causing a larger signal phase error between the light-receiving array PI1 and the light-receiving array PA2.

On the other hand, according to this embodiment, the absolute position is first calculated by superimposing the position within one pitch specified based on the low incremental signal of the light-receiving array PI1 onto the absolute position specified based on the absolute signals of the light-receiving arrays PA1, PA2 as described above. As a result, the signal phase error between the light-receiving array PI1 and the light-receiving arrays PA1, PA2, respectively, are preferably as small as possible. Consequently, in the comparison example, a relatively large phase error occurs between the light-receiving array PI1 and the light-receiving array PA2, possibly affecting the signal processing in the aforementioned stacking-up method. Further, the displacement amounts ΔP1', ΔP2' of the light-receiving arrays PA1, PA2 differ from each other, causing the unbalance of the phase error to possibly affect the signal processing as well.

Figure 16:
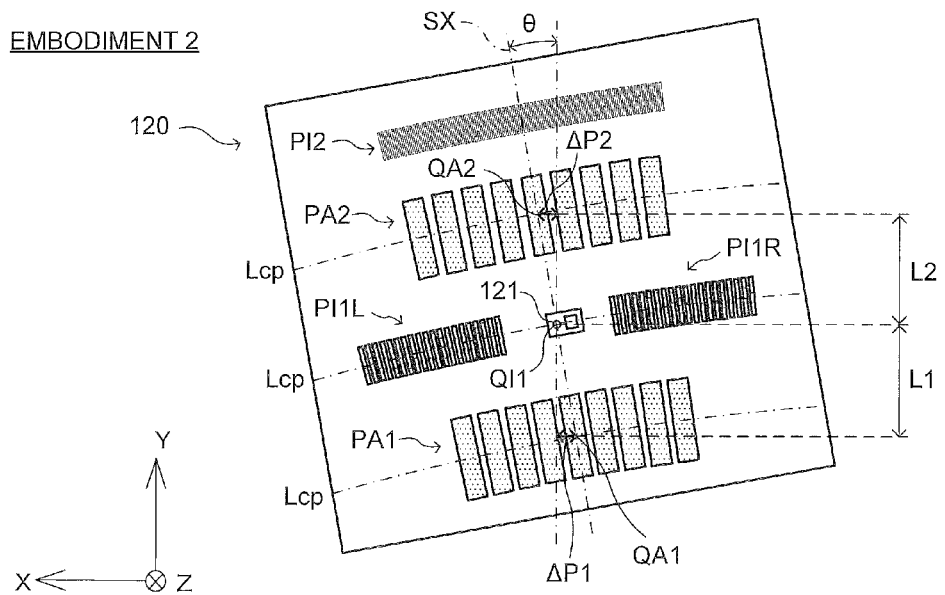
FIG. 16 is an explanatory view for explaining an optical module related to embodiment 2 with a shifted rotating direction.

On the other hand, according to this embodiment, the light-receiving array PI2 that outputs a high incremental signal is disposed so as to sandwich the light-receiving array PA2 with the light source 121. That is, the light-receiving array PI2 is disposed on the outside of the light-receiving array PA2 (the side opposite the light source 121), thereby making it possible to dispose the light-receiving arrays PI1L, PI1R on the inside of the absolute light-receiving arrays PA1, PA2 (the light source 121 side). FIG. 16 shows this optical module 120 shifted by an angle θ in the rotating direction. Note that, for convenience of explanation of the displacement amounts, the rotation here is a rotation in which the line that passes through a center point QI1 of the light-receiving arrays PI1L, PI1R (the point of intersection of the line Lcp that passes through the width direction center of the light-receiving arrays PI1L, PI1R and the axis SX of symmetry) and is parallel to the Z axis serves as the axis of rotation. The displacement amounts in the direction along the X axis of the light-receiving arrays PA1, PA2 in this state are ΔP1, ΔP2, respectively. Given L1 as the distance in the direction along the Y axis between the center point QI1 of the light-receiving array PI1 and a center point QA1 of the light-receiving array PA1 (the point of intersection of the line Lcp that passes through the width direction center of the light-receiving array PA1, and the axis SX of symmetry), and L2 as the distance in the direction along the Y axis between the center point QI1 of the light-receiving array PI1 and a center point QA2 of the light-receiving array PA2 (the point of intersection of the line Lcp that passes through the width direction center of the light-receiving array PA2, and the axis SX of symmetry), then ΔP1=L1 tan θ, ΔP2=L2 tan θ. According to this embodiment, the light-receiving arrays PI1L, PI1R are disposed on the inside of the light-receiving arrays PA1, PA2, making it possible to decrease L2 in comparison to L2' in the above described comparison example. As a result, the displacement amount ΔP2 of the light-receiving array PA2 is smaller compared to the displacement amount ΔP2' in the comparison example, making it possible to decrease the phase error between the light-receiving array PI1 and the light-receiving array PA2. Furthermore, in a case where L1 and L2 are substantially equal as in this embodiment, the displacement amounts of both the light-receiving arrays PA1, PA2 can be minimized and, since both displacement amounts become equal, the unbalance in the phase error can be eliminated and the effect on signal processing minimized. Consequently, the configuration in this embodiment is extremely advantageous in a case where the robustness with respect to the displacement of the optical module 120 in the rotating direction needs to be improved.

Further, in a case where a configuration is adopted in which the light-receiving array PI2 is disposed in a position away from the light source 121, sandwiching another light-receiving array, as in this embodiment, it is possible to suppress the responsiveness reduction effect to a minimum. That is, the signals output from the light-receiving arrays PA1, PA2 represent a relatively low-accuracy absolute position within one rotation, as described above. These output signals serve as the foundation of the final absolute position, and therefore precision and responsiveness are required for accuracy improvement. Consequently, the disposed positions of the light-receiving arrays PA1, PA2 also serve as important factors in accuracy improvement.

On the other hand, in a case where three types of light-receiving arrays (an example of the first to third light-receiving arrays) are disposed as in this embodiment, it becomes difficult to dispose all of the types of light-receiving arrays adjacent to the light source 121, and at least one type of light-receiving array sandwiches another light-receiving array with the light source 121. Based on such circumstances, according to this embodiment, the light-receiving array PI2 is disposed sandwiching another light-receiving array with the light source 121. As a result, it is possible to arrange the light-receiving arrays PA1, PA2, which have a relatively large effect on the accuracy of the absolute position, near the light source 121, making it possible to improve responsiveness and, further, the accuracy of the absolute position.

On the other hand, a portion of the reflection light from the slit tracks may be reflected on the surface of each light-receiving element included in each light-receiving array. When this reflection light is reflected once again by the slit tracks and received by another light-receiving array, crosstalk occurs, causing noise. Consequently, by disposing the light-receiving array PI2 in a position where it sandwiches another light-receiving array with the light source 121 as in this embodiment, the light-receiving arrays PA1, PA2 with a relatively large noise effect can be disposed so that another light-receiving array does not exist between them and the light source 121. This makes it possible to reduce the noise resulting from the reflection components of the light-receiving arrays and improve accuracy.

Further, as described above, in a case where two light-receiving arrays are disposed in the same direction with respect to the light source 121 in the optical module 120, crosstalk in which, for example, the scattered light in the reflection light that should reach one light-receiving array reaches the other light-receiving array, occurs between both light-receiving arrays, causing noise. Then, the light-receiving array that is farther away from the light source 121 receives a greater amount of irregular reflection components of the light than the light-receiving array that is closer to the light source 121, sometimes producing even greater noise.

On the other hand, the light-receiving array PI2 is an incremental light-receiving array with relatively high resistance to noise. Consequently, the noise of the light-receiving array with a relatively large noise effect can be reduced and accuracy can be improved by disposing the light-receiving array PI2 in a position where it sandwiches another light-receiving array with the light source 121, as in this embodiment.

Further, according to the configuration in this embodiment, the noise superimposed onto the light-receiving array PI2 is absolute pattern dependent. Consequently, it is possible to significantly suppress any increase in noise resulting from the irregular reflection light interfering with the reflection light to be received by the light-receiving array PI2 disposed in a position where the noise is relatively superimposed, or the like. Thus, the configuration in this embodiment is extremely advantageous in a case where interference by noise needs to be suppressed.

Further, the light-receiving arrays PI1, PI2 require a relatively small amount of received light and, since the noise is averaged, have a relatively high resistance to noise, whereas the light-receiving arrays PA1, PA2 require an adequate amount of received light and have a relatively low resistance to noise, as described above. Consequently, in a case where the amount of received light by the absolute is to be maintained and the noise effect on the absolute signal is to be suppressed, a configuration can be adopted in which the light-receiving arrays PA1, PA2 are disposed in positions closer to the light source 121 than the light-receiving array PI2, as in this embodiment. With this arrangement, it is possible to dispose the light-receiving arrays PA1, PA2 near the light source 121 and maintain the amount of received light. Further, of the light-receiving arrays disposed in the same direction with respect to the light source 121, while the light-receiving array that is farther away from the light source receives a greater amount of irregular reflection components of the light than the light-receiving array that is closer to the light source as described above, according to this embodiment, the light-receiving array PI2 having a high resistance to noise is disposed in a position away from the light source 121 in the same direction, and the light-receiving array PA2 having a low resistance to noise is disposed in a position near the light source 121, thereby making it possible to suppress the noise effect resulting from the aforementioned irregular reflection components to a minimum.

Further, the detection error resulting from the eccentricity of the disk 110 generally tends to be dependent on the radius of the slit track, increasing when the radius is small and decreasing when the radius is large. Consequently, in a case where the robustness with respect to the eccentricity of a high incremental signal is to be enhanced, a configuration can be adopted in which the light-receiving array PI2 is disposed on the side opposite the center axis with respect to the light source 121, as in this embodiment. With this arrangement, the slit track SI2 with a short pitch (that is, with many slits) is disposed on the outer circumference side on the disk 110, making it possible to increase the radius of the slit track SI2. As a result, the detection error resulting from the eccentricity of the light-receiving array PI2 that outputs high incremental signals can be decreased, and the robustness with respect to eccentricity can be enhanced. Further, a larger pitch of the slit track SI2 with many slits can be maintained.

2-3. Modifications of Embodiment 2

While the above has described embodiment 2, the spirit and scope of the present invention set forth in the claims is not limited to the embodiment described above.

Figure 17:
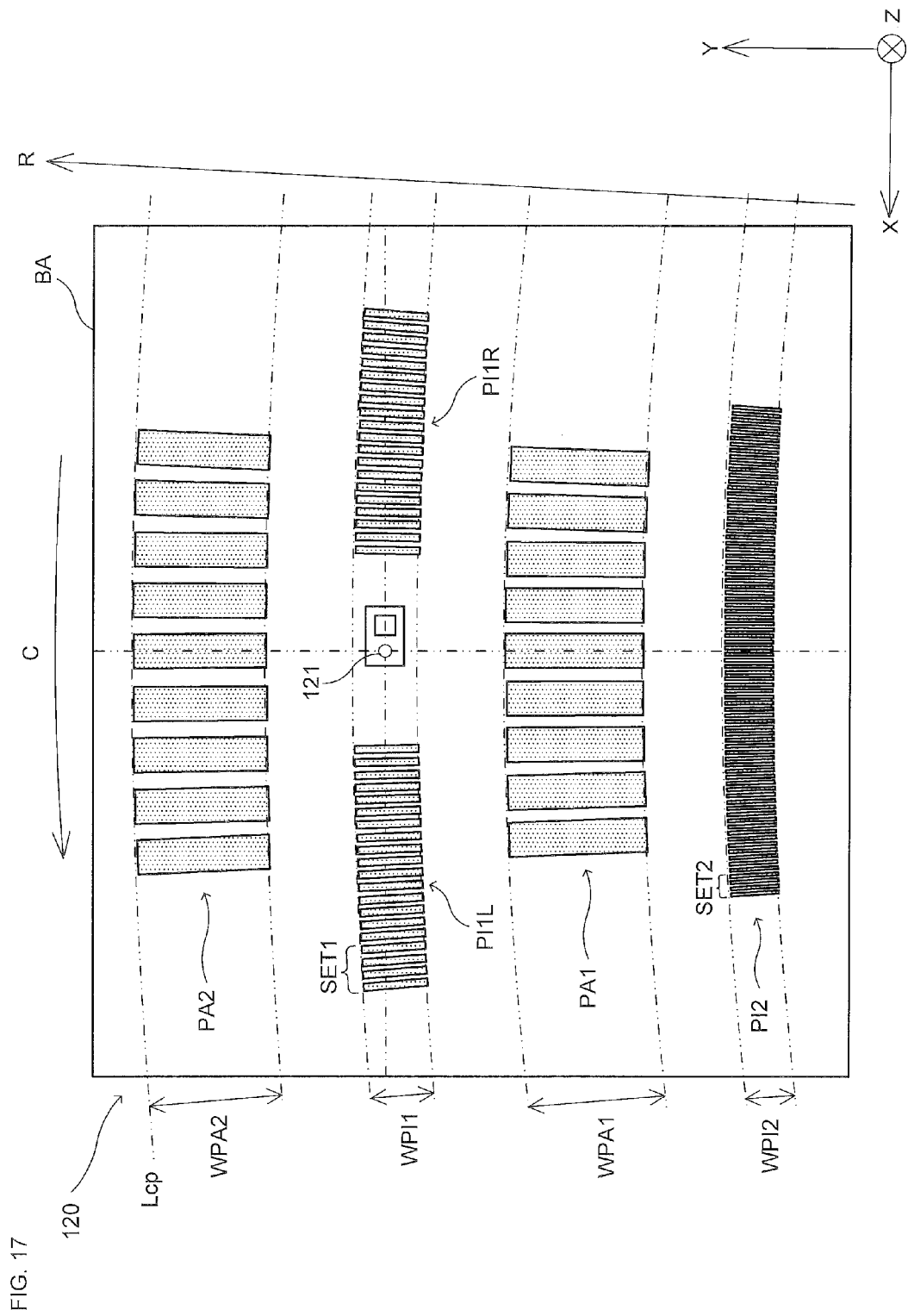
FIG. 17 is an explanatory view for explaining an optical module and a light-receiving array related to a modification of embodiment 2.

For example, while the above described embodiment 2 has described an illustrative scenario in which the light-receiving array PI2 is disposed on the side opposite the center axis with respect to the light source 121, the light-receiving array PI2 may be disposed on the center axis side with respect to the light source 121 (the inner circumference side), as shown in FIG. 17, for example. Although not shown, in this case, the four slit tracks are disposed in the order of SI2, SA1, SI1, SA2, from the inside toward the outside in the width direction R on the disk 110. The configuration in the above described embodiment is preferably adopted in a case where the robustness with respect to the eccentricity of the high incremental signal is to be enhanced, and this configuration is preferably adopted in a case where the robustness with respect to the eccentricity of the low incremental signal is to be enhanced.

Embodiment 3

Next, embodiment 3 will be described. Note that the following mainly describes the sections that differ from embodiment 1 and embodiment 2; the sections that are the same as embodiment 1 and embodiment 2 are denoted using the same reference numerals, and explanations thereof are suitably omitted.

3-1. Encoder

Next, the encoder 100 related to this embodiment will be described.

3-1-1. Optical Detecting Mechanism

Figure 18:
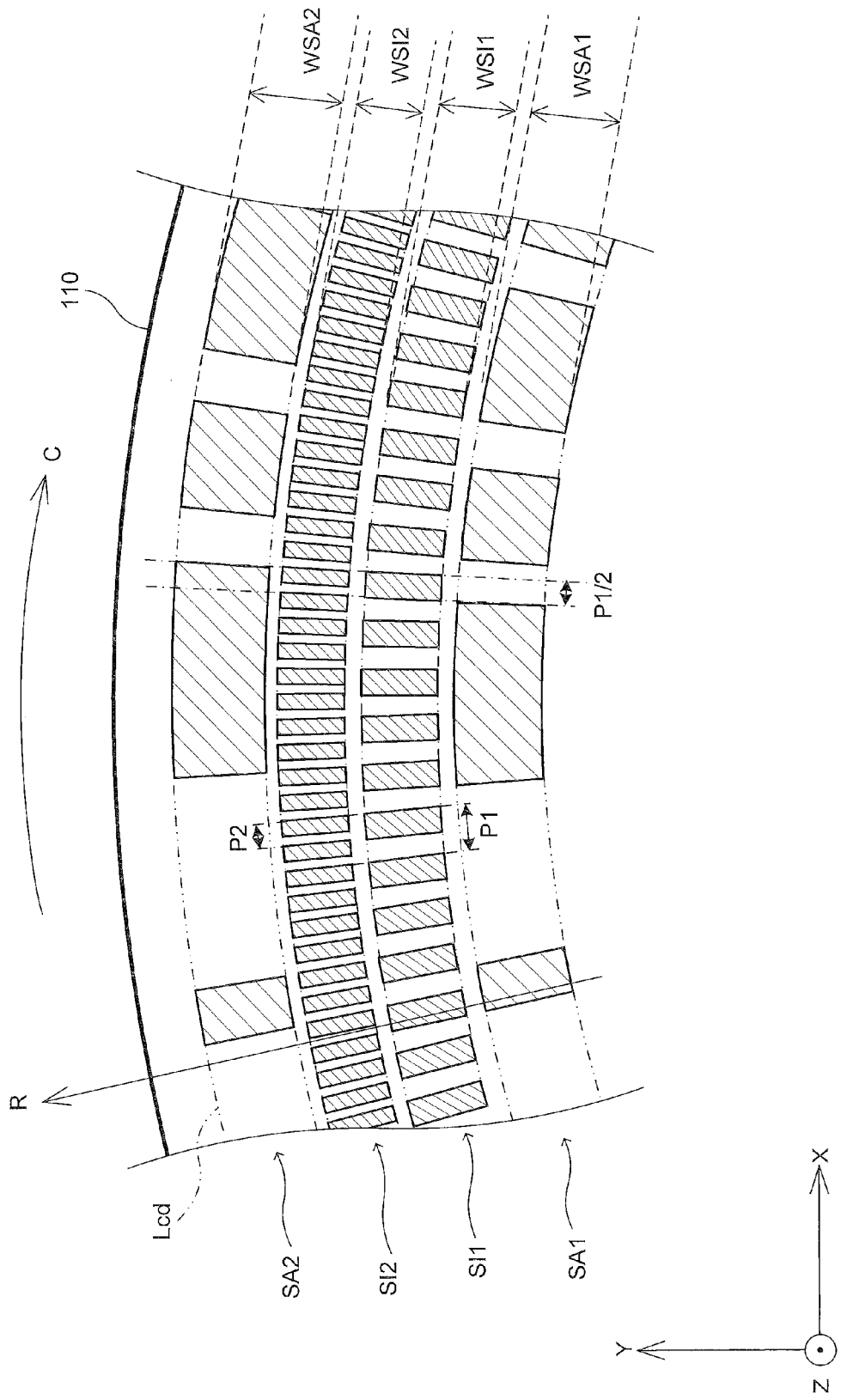
FIG. 18 is an explanatory view for explaining a slit track related to embodiment 3.

As shown in FIG. 18, the four slit tracks are concentrically disposed in the order of SA1, SI1, SI2, SA2, from the inside toward the outside in the width direction R on the disk 110. Further, the optical module 120, as shown in FIG. 19, comprises the light source 121, and the plurality of light-receiving arrays PA1, PA2, PI1, PI2L, PI2R on the surface of the substrate BA facing the disk 110.

The light-receiving array PA1 is configured to receive the light reflected by the slit track SA1, and the light-receiving array PA2 is configured to receive the light reflected by the slit track SA2. Further, the light-receiving array PI1 is configured to receive the light reflected by the slit track SI1, and the light-receiving arrays PI2L, PI2R are configured to receive the light reflected by the slit track SI2. While the light-receiving arrays PI2L, PI2R are divided in the middle, they correspond to the same track.

Figure 19:
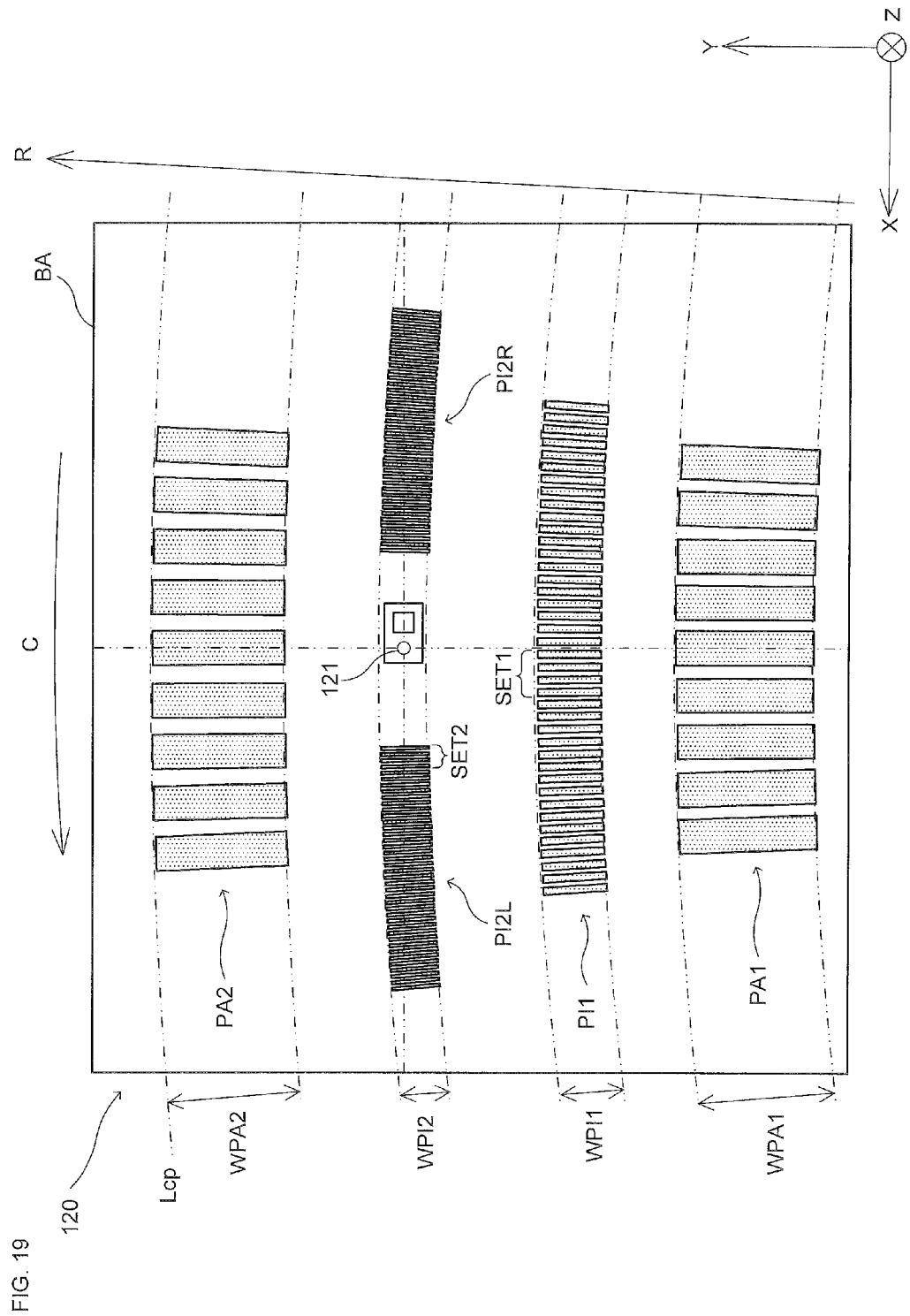
FIG. 19 is an explanatory view for explaining an optical module and a light-receiving array related to embodiment 3.

The light source 121, the light-receiving arrays PA1, PA2, and the light-receiving arrays PI1, PI2L, PI2R are disposed in the positional relationship shown in FIG. 19. The light-receiving arrays PA1, PA2 corresponding to the absolute pattern are disposed sandwiching the light source 121 in the width direction R in the same manner as embodiment 1 and embodiment 2.

The light-receiving arrays PI2L, PI2R corresponding to the incremental pattern are disposed sandwiching the light source 121 in the measurement direction C. Further, the light-receiving array PI1 corresponding to the incremental pattern is disposed between the two light-receiving arrays PA1, PA2 in the disposed direction of the light-receiving array PA1, with the light source 121 as the center. More specifically, the light-receiving array PI1 is disposed between the light source 121 and the light-receiving array PA1, on the center axis side with respect to the light source 121. Specifically, the light-receiving arrays PI2L, PI2R are axisymmetrically disposed with a line parallel to the Y axis, which includes the light source 121, serving as the axis of symmetry, and each of the light-receiving arrays PA1, PA2, PI1 form an axisymmetrical shape about the above described symmetrical axis. The light source 121 is disposed between the light-receiving arrays PI2L, PI2R disposed as one track in the measurement direction C. Note that the light-receiving arrays PI2L, PI2R correspond to one example of the second light-receiving arrays, and also to one example of means for outputting a highly periodical repetition signal. Further, the light-receiving array PI1 corresponds to one example of the third light-receiving array, and also to one example of means for receiving light reflected by the slit track comprising an incremental pattern that differs in pitch from other incremental patterns.

Four incremental signals shifted from one another by a phase of 90° are respectively generated from the light-receiving arrays PI1, PI2L, PI2R. According to this embodiment, the incremental signals generated from the light-receiving arrays PI2L, PI2R corresponding to the slit track SI2 with a short pitch are referred to as "high incremental signals" since the resolution is high compared to other incremental signals, and the incremental signals generated from the light-receiving array PI1 corresponding to the slit track SU with a long pitch are referred to as "low incremental signals" since the resolution is low compared to other incremental signals.

3-1-2. Position Data Generating Part

The position data generating part 130 in this embodiment becomes the same configuration as that in embodiment 1 (FIG. 6). That is, the first position specifying part 132 specifies the position within one pitch from two signals with a phase difference of 180° of the low incremental signals of the respective four phases from the light-receiving array PI1. The position data calculating part 134 superimposes the position within one pitch specified by the first position specifying part 132 onto the absolute position specified by the absolute position specifying part 131. On the other hand, the second position specifying part 133 specifies a highly accurate position within one pitch from the high incremental signals from the light-receiving arrays PI2L, PI2R. Then, the position data calculating part 134 superimposes the position within one pitch specified by the second position specifying part 133 onto the absolute position calculated based on the aforementioned low incremental signals. The position data calculating part 134 performs multiplication processing on the absolute position thus calculated to further improve the resolution, and outputs the result as position data representing a highly accurate absolute position to the controller CT.

3-2. Examples of Advantages of Embodiment 3

According to this embodiment, similar to the aforementioned embodiment 1 and embodiment 2, it is possible to generate position data representing an absolute position with high resolution by the aforementioned stacking-up method, making it possible to achieve high resolution. Further, the light-receiving array PI1 is disposed between the two light-receiving arrays PA1, PA2, making it possible to achieve higher accuracy in addition to the aforementioned higher resolution. Note that to "achieve higher accuracy" here refers to increasing the reliability of the detection signal by improving signal processing accuracy and reducing noise, and the like.

As described above, according to this embodiment, a high-resolution absolute position is calculated by superimposing the position within one pitch specified based on the high incremental signal of the light-receiving array PI2 onto the absolute position calculated based on the absolute signals of the light-receiving arrays PA1, PA2 and the low incremental signal of the light-receiving array PI1. If signal processing by such a stacking-up method is to be performed more accurately, the phase error between the low incremental signal of the light-receiving array PI1 and the high incremental signal of the light-receiving array PI2 is preferably as small as possible.

According to this embodiment, the light-receiving array PI1 is disposed between the two light-receiving arrays PA1, PA2. On the other hand, the light-receiving arrays PA1, PA2 are disposed sandwiching the point light source in the width direction. With this arrangement, it is possible to dispose the light-receiving array PI1 near the light-receiving arrays PI2L, PI2R disposed sandwiching the light source 121 in the measurement direction. Consequently, the mechanical alignment when forming both light-receiving arrays on the substrate BA and when positioning the optical module 120 with respect to the disk 110 becomes relatively easy, making it possible to reduce the displacement of the light-receiving array PI1 and the light-receiving array PI2 compared to a case where both light-receiving arrays are separated. As a result, it is possible to reduce the phase error of the signals of the light-receiving array PI1 and the light-receiving array PI2, thereby making it possible to improve the accuracy of the signal processing by the stacking-up method.

Further, according to this embodiment, the light-receiving array PI1 is disposed between the two light-receiving arrays PA1, PA2. On the other hand, the light-receiving arrays PA1, PA2 are disposed sandwiching the point light source in the width direction. Consequently, the light-receiving array PI1 can be arranged near the light source 121. As a result, the light-receiving array PI1 and both the light-receiving arrays PI2L, PI2R disposed sandwiching the light source 121 in the measurement direction can be disposed near the light source 121, making it possible to maintain the amount of received light required for performing the signal processing of each light-receiving array more accurately. Consequently, the accuracy of the signal processing by the stacking-up method can be improved.

Figure 20:
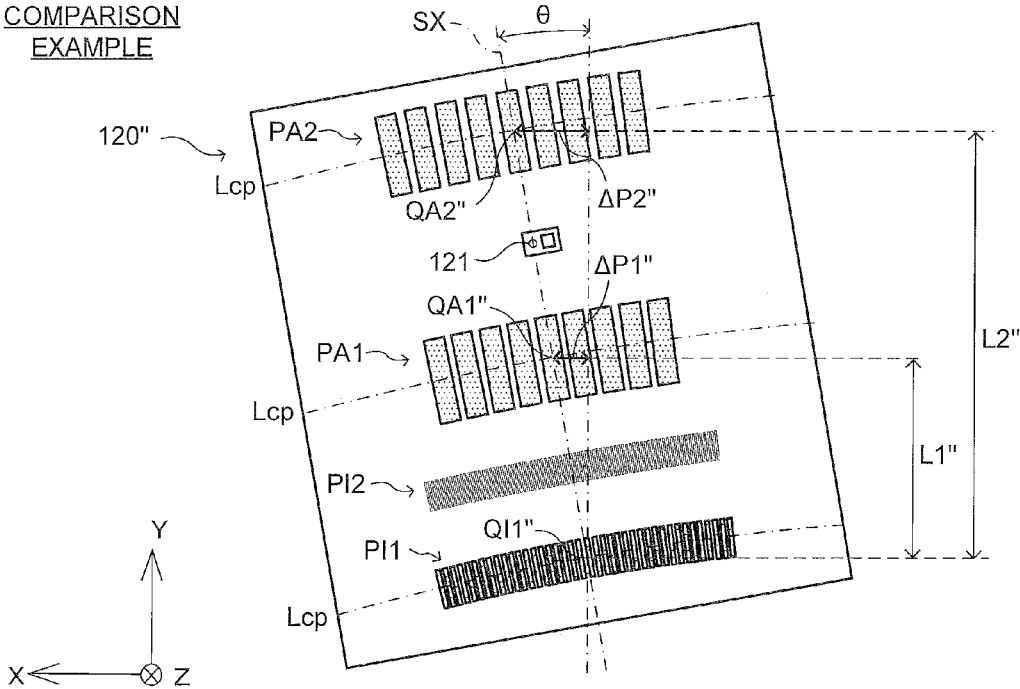
FIG. 20 is an explanatory view for explaining an optical module related to a comparison example with a shifted rotating direction.

Furthermore, according to this embodiment, it is possible to improve robustness with respect to displacement of the optical module 120 in the rotating direction. This advantage will now be described using the comparison example shown in FIG. 20. As shown in FIG. 20, according to an optical module 120" related to the comparison example, the light-receiving arrays PI1, PI2 are disposed so as to sandwich the light-receiving array PA1 with the light source 121. That is, according to the optical module 120" related to the comparison example, the light-receiving arrays PI1, PI2 are disposed on the outside of the absolute light-receiving array PA1 (the side opposite the light source 121). The light-receiving array PI2 corresponds to the light-receiving arrays PI2L, PI2R in embodiment 3, and is configured to receive light reflected by the slit track SI2 comprising an incremental pattern that is shorter in pitch than other incremental patterns. The other configurations of the optical module 120" are the same as those of the optical module 120 related to embodiment 3. Note that this comparison example may be configured with the light-receiving arrays PI1, PI2 disposed so as to sandwich the light-receiving array PA2 with the light source 121.

FIG. 20 shows such the optical module 120" shifted by an angle θ in the rotating direction. Note that FIG. 20 shows the inclined angle exaggerated in size for ease of understanding (the same also holds true for FIG. 21 described later). Further, for convenience of explanation of displacement amounts, the rotation here is a rotation in which the line that passes through a center point QI1" of the light-receiving array PI1 (the point of intersection of the line Lcp that passes through the width-direction center of the light-receiving array PI1 and the aforementioned axis SX of symmetry) and is parallel to the Z axis serves as the axis of rotation. The displacement amounts in the direction along the X axis of the light-receiving arrays PA1, PA2 in this state are ΔP1", ΔP2", respectively. Given L1" as the distance in the direction along the Y axis between the center point QI1" of the light-receiving array PI1 and a center point QA1" of the light-receiving array PA1 (the point of intersection of the line Lcp that passes through the width direction center of the light-receiving array PA1, and the axis SX of symmetry), and L2" as the distance in the direction along the Y axis between the center point QI1" of the light-receiving array PI1 and a center point QA2" of the light-receiving array PA2 (the point of intersection of the line Lcp that passes through the width direction center of the light-receiving array PA2, and the axis SX of symmetry), then ΔP1=L1" tan θ, ΔP2=L2" tan θ. That is, the displacement amount of the light-receiving arrays PA1, PA2 in a case where the optical module 120" is displaced in the rotating direction increases in proportion to the distance from light-receiving array PI1. According to this comparison example, the light-receiving arrays PI1, PI2 are disposed on the outside of the light-receiving array PA1, relatively increasing the distances L1", L2" of the light-receiving arrays PA1, PA2 from the light-receiving array PI1, and also increasing the displacement amounts ΔP1", ΔP2" of the light-receiving arrays PA1, PA2. Consequently, a larger signal phase error may occur between the light-receiving array PI1 and the light-receiving arrays PA1, PA2.

On the other hand, according to this embodiment, the absolute position is first calculated by superimposing the position within one pitch specified based on the low incremental signal of the light-receiving array PI1 onto the absolute position specified based on the absolute signals of the light-receiving arrays PA1, PA2 as described above. As a result, the signal phase error between the light-receiving array PI1 and the light-receiving arrays PA1, PA2, respectively, are preferably as small as possible. Consequently, in the comparison example, a relatively large phase error occurs between the light-receiving array PI1 and the light-receiving arrays PA1, PA2, possibly affecting the signal processing in the aforementioned stacking-up method. Further, the displacement amounts ΔP1", ΔP2" of the light-receiving arrays PA1, PA2 differ from each other, causing the unbalance of the phase error to possibly affect signal processing as well.

Figure 21:
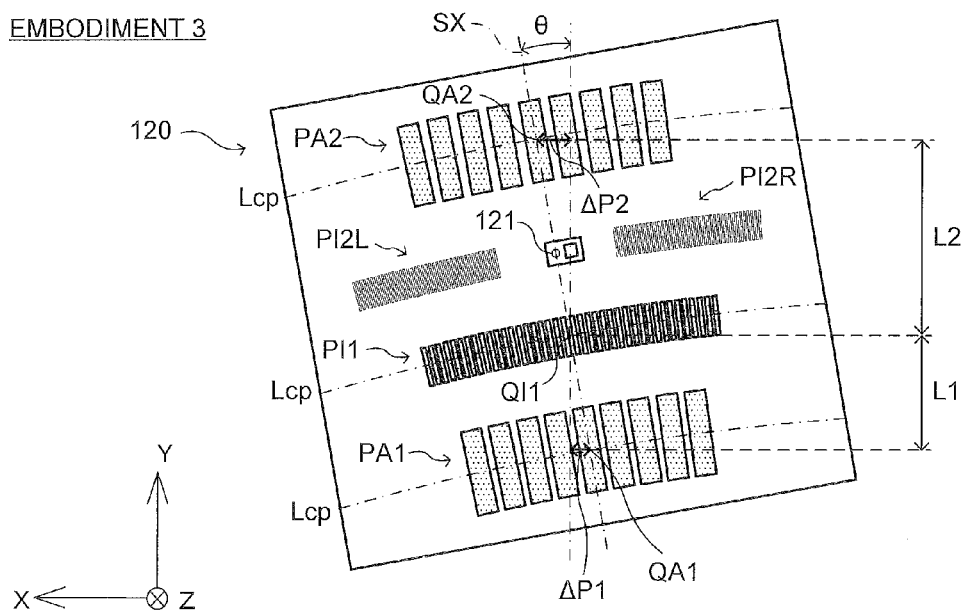
FIG. 21 is an explanatory view for explaining an optical module related to embodiment 3 with a shifted rotating direction.

On the other hand, according to this embodiment, as a result of the light-receiving array PI1 being disposed between the two light-receiving arrays PA1, PA2 as described above, the light-receiving array PI1 and the light-receiving arrays PI2L, PI2R can be disposed on the inside of the light-receiving arrays PA1, PA2 (the light source 121 side). FIG. 21 shows this optical module 120 shifted by an angle θ in the rotating direction. Note that, for the convenience of explanation of displacement amounts, the rotation here is a rotation in which the line that passes through the center point QI1 of the light-receiving array PI1 (the point of intersection of the line Lcp that passes through the width direction center of the light-receiving array PI1 and the axis SX of symmetry) and is parallel to the Z axis serves as the axis of rotation. The displacement amounts in the direction along the X axis of the light-receiving arrays PA1, PA2 in this state are ΔP1, ΔP2, respectively. Given L1 as the distance in the direction along the Y axis between the center point QI1 of the light-receiving array PI1 and a center point QA1 of the light-receiving array PA1 (the point of intersection of the line Lcp that passes through the width direction center of the light-receiving array PA1, and the axis SX of symmetry), and L2 as the distance in the direction along the Y axis between the center point QI1 of the light-receiving array PI1 and a center point QA2 of the light-receiving array PA2 (the point of intersection of the line Lcp that passes through the width direction center of the light-receiving array PA2, and the axis SX of symmetry), then ΔP1=L1 tan θ, ΔP2=L2 tan θ. According to this embodiment, the light-receiving arrays PI1, PI2 are disposed on the inside of the light-receiving arrays PA1, PA2, making it possible to decrease L1, L2 in comparison to L1", L2" in the above described comparison example. As a result, it is possible to decrease the displacement amounts ΔP1, ΔP2 of the light-receiving arrays PA1, PA2 compared to the displacement amounts ΔP1", ΔP2" in the comparison example, making it possible to decrease the respective phase errors between the light-receiving array PI1 and the light-receiving arrays PA1, PA2. Consequently, the configuration in this embodiment is extremely advantageous in a case where the robustness with respect to the displacement of the optical module 120 in the rotating direction needs to be improved.

Further, in a case where a configuration is adopted in which the light-receiving array configured to receive the light reflected by the slit track comprising an incremental pattern that differs in pitch from other incremental patterns is disposed between the light source 121 and the light-receiving array PA1 as in this embodiment, it is possible to suppress the responsiveness reduction effect to a minimum. That is, because the signals acquired from the light-receiving arrays PI2L, PI2R have high resolution, the signals become highly periodic repetition signals compared to those of other light-receiving arrays, but the accuracy of the final absolute position is relatively highly affected by the responsiveness of the signals output from the light-receiving arrays PI2L, PI2R. Consequently, the disposed positions of the light-receiving arrays PI2L, PI2R are important factors in accuracy improvement.

On the other hand, in a case where three types of light-receiving arrays (an example of the first to third light-receiving arrays) are disposed as in this embodiment, it becomes difficult to dispose all of the types of light-receiving arrays adjacent to the light source 121, and at least one type of light-receiving array sandwiches another light-receiving array with the light source 121. Based on such circumstances, according to this embodiment, the light-receiving array PI1 configured to receive light reflected by the slit track SI1 comprising an incremental pattern that differs in pitch from other incremental patterns is disposed between the two light-receiving arrays PA1, PA2. That is, either one of the light-receiving arrays PA1, PA2 sandwiches the light-receiving array PI1 with the light source 121. As a result, it is possible to arrange the light-receiving arrays PI2L, PI2R, which have a relatively large effect on the accuracy of the absolute position, near the light source 121 in a direction that differs from the light-receiving arrays PA1, PA2, making it possible to improve responsiveness and, further, the accuracy of the absolute position.

On the other hand, a portion of the reflection light from the slit tracks may be reflected on the surface of each light-receiving element included in each light-receiving array. When this reflection light is reflected once again by the slit tracks and received by another light-receiving array, crosstalk occurs, causing noise. According to this embodiment, the light-receiving array PI1 is disposed between the two light-receiving arrays PA1, PA2. That is, either one of the light-receiving arrays PA1, PA2 sandwiches the light-receiving array PI1 with the light source 121. With this arrangement, it is possible to dispose the light-receiving arrays PI2L, PI2R with a relatively large noise effect and one of the light-receiving arrays PA1, PA2 so that other light-receiving arrays do not exist between the light-receiving arrays and the light source 121, making it possible to reduce the noise resulting from the reflection components of the light-receiving arrays and improve accuracy.

Further, as described above, in a case where two light-receiving arrays are disposed in the same direction with respect to the light source 121 in the optical module 120, crosstalk in which, for example, the scattered light in the reflection light that should reach one light-receiving array reaches the other light-receiving array, occurs between both light-receiving arrays, causing noise. Then, the light-receiving array that is farther away from the light source 121 receives a greater amount of irregular reflection components of the light than the light-receiving array that is closer to the light source 121, sometimes producing even greater noise.

On the other hand, while the light-receiving array PI1 receives the reflection light of the incremental pattern, the reflection light is repetition light repeated at a certain period. Consequently, if the irregular reflection components of the repetition light were to be superimposed onto the light received by the light-receiving array PA1, the noise could be reduced by using noise reduction means, such as a noise filter. On the other hand, the reflection light received by the light-receiving array PA1 is reflection light from the absolute pattern, and therefore either does not have such a repetition period or has a relatively long period. As a result, if the irregular reflection components of the light were to be superimposed onto the light received by the light-receiving array PI1, the noise would not readily be reduced by the noise filter or the like.

According to the configuration in this embodiment, the noise superimposed onto the light-receiving array PA1 is incremental pattern dependent. Consequently, it is possible to significantly suppress any increase in noise resulting from the irregular reflection light interfering with the reflection light to be received by the light-receiving array PA1 disposed in a position where the noise is relatively superimposed, or the like. Consequently, the configuration in this embodiment is extremely advantageous in a case where interference by noise needs to be suppressed.

Furthermore, according to this embodiment, the light-receiving arrays PI2L, PI2R wherein the noise affects accuracy relatively easily can be disposed in a direction that differs from those of other light-receiving arrays with respect to the light source 121. Consequently, the amount of light of the irregular reflection itself that reaches the light-receiving arrays PI2L, PI2R is reduced, making it possible to further improve accuracy.

Further, the light-receiving arrays PI1, PI2 require a relatively small amount of received light and, since the noise is averaged, have a relatively high resistance to noise, whereas the light-receiving arrays PA1, PA2 require an adequate amount of received light and have a relatively low resistance to noise, as described above.

Hence, the diffusion light tends to be scattered by other members near the light source 121. For example, if the light source 121 is an LED, bonding wires for supplying power and the like (not shown) protrude in or near the optical path. The scattered light resulting from these wires and the like causes noise. The main source from which the scattered light is produced is the light source 121, and therefore the above described noise attenuates in accordance with the distance from the light source 121. Consequently, the noise can be reduced by increasing the distance between the light source 121 and the light-receiving arrays.

Consequently, in a case where the noise effect resulting from the above described scattered light is to be suppressed, a configuration can be adopted in which the light-receiving array PI1 is disposed between the two light-receiving arrays PA1, PA2, as in this embodiment. With this arrangement, either one of the light-receiving arrays PA1, PA2 sandwiches the light-receiving array PI1 with the light source 121, thereby making it possible to dispose one of the light-receiving arrays PA1, PA2 having a low resistance to noise in a position away from the light source 121, and decrease the noise effect resulting from the aforementioned scattered light.

Further, the detection error resulting from the eccentricity of the disk 110 generally tends to be dependent on the radius of the slit track, increasing when the radius is small and decreasing when the radius is large. Consequently, in a case where the robustness with respect to the eccentricity of a high incremental signal is to be enhanced, a configuration can be adopted in which the light-receiving array PI1 is disposed on the center axis side with respect to the light source 121, as in this embodiment. With this arrangement, the light-receiving arrays PI2L, PI2R are disposed further on the side opposite the center axis than the light-receiving array PI1 (i.e., the outer circumference side), and the slit track SI2 with a short pitch (i.e., with many slits) is disposed on the outer circumference side on the disk 110, making it possible to increase the radius of the slit track SI2. As a result, the detection error resulting from the eccentricity of the light-receiving arrays PI2L, PI2R that output high incremental signals can be decreased, and the robustness with respect to eccentricity can be enhanced. Further, a larger pitch of the slit track SI2 with many slits can be maintained.

3-3. Modifications of Embodiment 3

While the above has described embodiment 3, the spirit and scope of the present invention set forth in the claims is not limited to the embodiment described above.

For example, while the above described embodiment 3 has described an illustrative scenario in which the light-receiving array PI1 is disposed on the center axis side with respect to the light source 121, the light-receiving array PI1 may be disposed on the side opposite the center axis with respect to the light source 121 (the outer circumference side), i.e., between the light source 121 and the light-receiving array PA2. Although not shown, in this case, the four slit tracks are disposed in the order of SA1, SI2, SI1, SA2, from the inside toward the outside in the width direction R on the disk 110. The configuration in the above described embodiment 3 is preferably adopted in a case where the robustness with respect to the eccentricity of a high incremental signal is to be enhanced, and this configuration is preferably adopted in a case where the robustness with respect to the eccentricity of a low incremental signal is to be enhanced.

Figure 22:
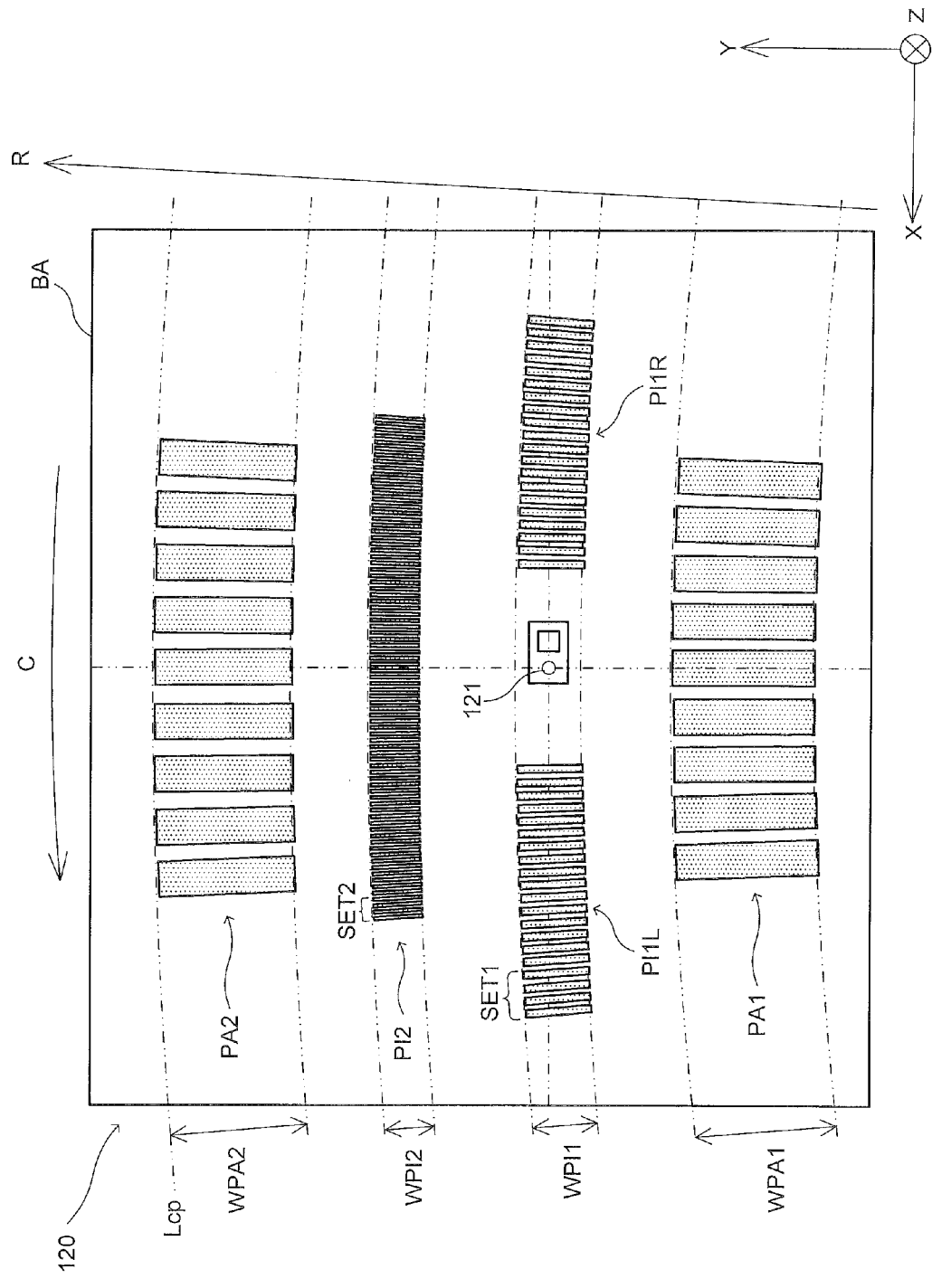
FIG. 22 is an explanatory view for explaining an optical module and a light-receiving array related to a modification of embodiment 3.

Further, while the above described embodiment 3 has described an illustrative scenario in which the light-receiving array PI2 that outputs a high incremental signal is disposed sandwiching the light source 121 in the measurement direction, the light-receiving array PI1 that outputs a low incremental signal may be disposed sandwiching the light source 121 in the measurement direction, as shown in FIG. 22, for example. In this case, if the robustness with respect to the eccentricity of the high incremental signal is to be enhanced as in the above described embodiment, a configuration in which the light-receiving array PI2 is disposed on the side opposite the center axis with respect to the light source 121 (the outer circumference side), i.e., between the light source 121 and the light-receiving array PA2, is preferably adopted, as shown in FIG. 22. Although not shown, in this case, the four slit tracks are disposed in the order of SA1, SI1, SI2, SA2, from the inside toward the outside in the width direction R on the disk 110. On the other hand, conversely to the above, if the robustness with respect to the eccentricity of the low incremental signal is to be enhanced, a configuration in which the light-receiving array PI2 is disposed on the center axis side with respect to the light source 121 (the inner circumference side), i.e., between the light source 121 and the light-receiving array PA1, is preferably adopted. In this case, the four slit tracks are disposed in the order of SA1, SI2, SI1, SA2, from the inside toward the outside in the width direction R on the disk 110. Note that the light-receiving arrays PI1L, PI1R in this modification are equivalent to one example of the second light-receiving array, and also to one example of means for outputting a highly periodical repetition signal. Further, the light-receiving array PI2 corresponds to one example of the third light-receiving array, and also to one example of means for receiving light reflected by the slit track comprising an incremental pattern that differs in pitch from other incremental patterns.

Figure 23:
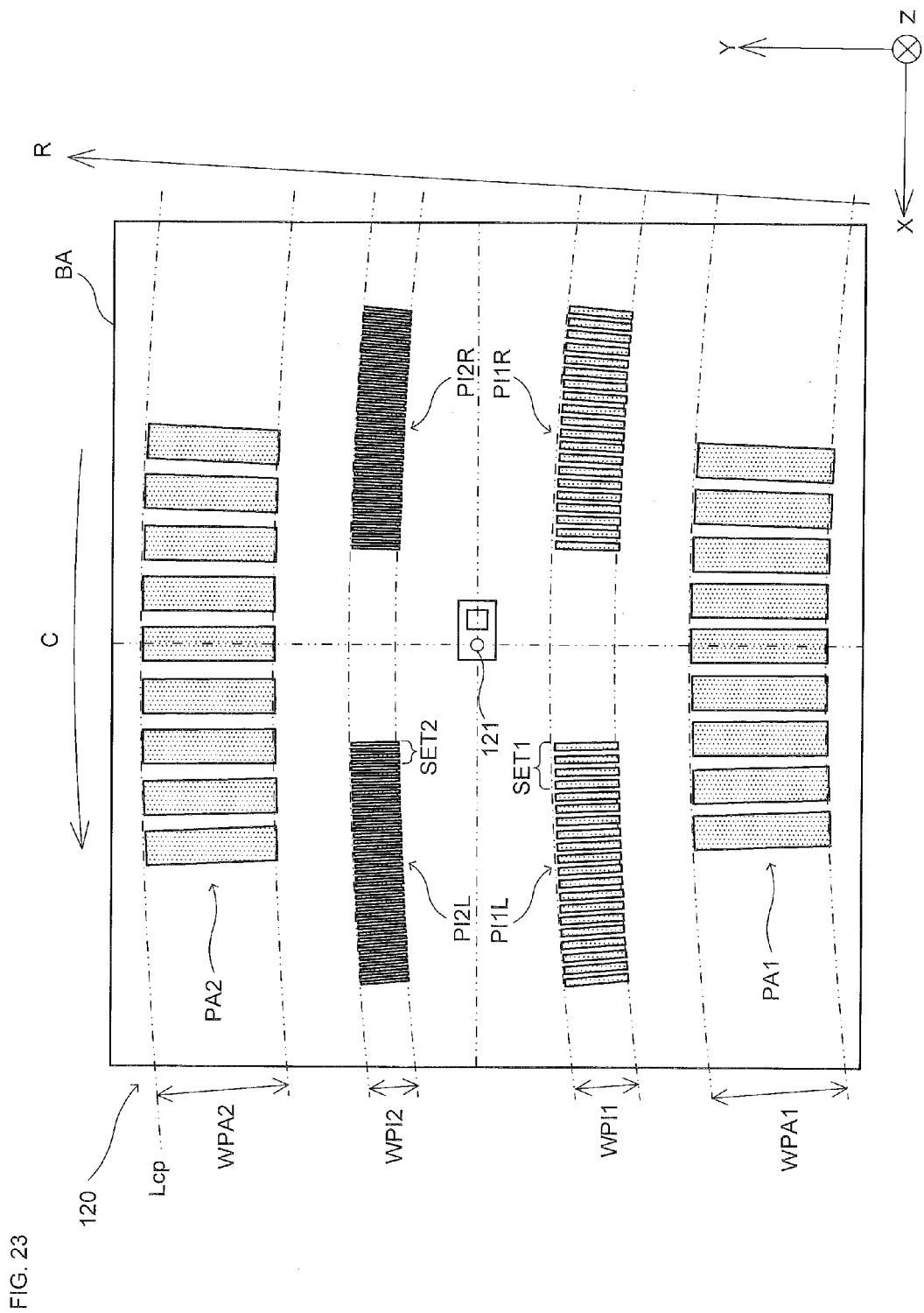
FIG. 23 is an explanatory view for explaining an optical module and a light-receiving array related to another modification of embodiment 3.

Further, while the above has described a case where only either one of the light-receiving arrays PI1, PI2 corresponding to the incremental pattern is disposed in duplicate, sandwiching the light source 121 in the measurement direction, both of the light-receiving arrays PI1, PI2 may be disposed in duplicate, substantially sandwiching the light source 121 in the measurement direction, as shown in FIG. 23, for example. Here, "substantially" refers to the positions of the light-receiving arrays PI1, PI2 and the light source 121 in the width direction R not being respectively the same, but rather offset, with the light-receiving arrays PI1, PI2 disposed sandwiching the position corresponding to the light source 121 in the measurement direction. The light-receiving arrays PI1L, PI1R are configured to receive the light reflected by the slit track SI1, and the light-receiving arrays PI2L, PI2R are configured to receive the light reflected by the slit track SI2. In this example, the light-receiving arrays PI1L, PI1R and the light-receiving arrays PI2L, PI2R are substantially disposed equidistant from the light source 121. Note that one of the light-receiving arrays PI1L, PI1R and the light-receiving arrays PI2L, PI2R corresponds to one example of the second light-receiving array, and also to one example of means for outputting a highly periodical repetition signal. Further, the other of the light-receiving arrays PI1L, PI1R and the light-receiving arrays PI2L, PI2R corresponds to one example of the third light-receiving array, and also to one example of means for receiving light reflected by the slit track comprising an incremental pattern that differs in pitch from other incremental patterns.

According to this modification, it is possible to collectively dispose all of the light-receiving arrays PI1L, PI1R and the light-receiving arrays PI2L, PI2R near the light source 121, making it possible to improve responsiveness for both the light-receiving arrays PI1L, PI1R that output low incremental signals, and the light-receiving arrays PI2L, PI2R that output high incremental signals. Further, the distance between the light source 121 and the light-receiving array PI1 and the distance between the light source 121 and the light-receiving array PI2 can be made equal, making it possible to minimize the respective displacement amounts of the light-receiving arrays PI1, PI2 in a case where the optical module 120 is displaced around the optical axis of the light source 121 in the rotating direction. Further, the distance between the light source 121 and the light-receiving array PA1 and the distance between the light source 121 and the light-receiving array PA2 can be made equal, thereby equalizing the displacement amounts of the light-receiving arrays PA1, PA2, and making it possible to eliminate the unbalance of the phase error and minimize the effect on signal processing in a case where the optical module 120 is displaced around the optical axis of the light source 121 in the rotating direction. Consequently, it is possible to improve robustness with respect to displacement of the optical module 120 in the rotating direction.

Further, while the above described embodiment 3 (the example shown in FIG. 19) has described a case where the respective distances from the light source 121 to the light-receiving arrays PA1, PA2 differ, the light-receiving arrays PA1, PA2 are preferably disposed equidistant from the light source 121 in a case where the amount of received light in each of the light-receiving arrays is to be made uniform. With this arrangement, it is possible to configure the circuits respectively related to the light-receiving arrays PA1, PA2 as equivalent circuits.

Further, while the above described embodiment 3 (the example shown in FIG. 19) has described a case where the distance between the light-receiving array PI1 and the light-receiving array PA1 and the distance between the light-receiving array PI1 and the light-receiving array PA2 differ, the light-receiving arrays are preferably disposed equidistant in a case where the unbalance of the phase error between the light-receiving array PI1 and the light-receiving arrays PA1, PA2 is to be minimized. With this arrangement, the displacement amounts of the light-receiving arrays PA1, PA2 in a case where the optical module 120 is displaced in the rotating direction become equal, making it possible to eliminate the phase error unbalance and decrease the effect on signal processing.

4. Modifications Common to Each Embodiment

While the above has described embodiments 1-3, the spirit and scope of the present invention set forth in the claims is not limited to the embodiments described above.

For example, while the above described embodiments have described cases where the two slit tracks SI1, SI2 comprising incremental patterns that differ in pitch are disposed on the disk 110, three or more slit tracks comprising incremental patterns that differ in pitch may be disposed. In this case as well, it is possible to achieve high resolution by the stacking-up method. At this time, it is also possible to use at least one of the light-receiving arrays PA1, PA2 for the incremental signal, for example.

Further, while the above described embodiments have described cases where each of the light-receiving arrays PA1, PA2 comprises nine light-receiving elements, and the absolute signal represents the absolute position of nine bits, the number of light-receiving elements may be a number other than nine, and the number of bits of the absolute signal is also not limited to nine. Further, the number of the light-receiving elements of the light-receiving arrays PI1, PI2L, PI2R is also not particularly limited to the number according to the above described embodiments.

Further, while the above described embodiments have described cases where the encoder 100 is directly connected to the motor M, the encoder 100 may be connected via another mechanism, such as a reduction device, rotating direction converter, or the like, for example.

Further, while the above described embodiments have described cases where the light-receiving arrays PA1, PA2 are light-receiving arrays for absolute signals, the present invention is not limited thereto. For example, the light-receiving arrays PA1, PA2 may be a light-receiving element group for an origin representing the origin position by the detection signals from the respective light-receiving elements. In this case, the slit tracks SA1, SA2 of the disk 110 are formed comprising an origin pattern. Then, the bit pattern and intensity of the light reception signals from the light-receiving arrays PA1, PA2 represent the origin position.

What is claimed is:

1. An encoder, comprising:
a plurality of slit tracks that respectively comprise a plurality of reflection slits arranged along a measurement direction;
a point light source configured to emit diffusion light to the plurality of slit tracks;
two first light-receiving arrays disposed sandwiching the point light source in a width direction substantially orthogonal to the measurement direction;
two second light-receiving arrays disposed sandwiching the point light source in the measurement direction; and
a third light-receiving array that is configured to receive light reflected by the slit track comprising an incremental pattern that differs in pitch from other incremental patterns, and is disposed at a position in a direction where the first light-receiving array is disposed than the point light source.

2. The encoder according to claim 1, wherein:
the third light-receiving array is configured to receive light reflected by the slit track comprising the incremental pattern longer in pitch than other incremental patterns, and is disposed so as to sandwich the first light-receiving array with the point light source.

3. The encoder according to claim 2, wherein:
the measurement direction is a circumferential direction with a center axis as the center; and
the third light-receiving array configured to receive light reflected by the slit track comprising the incremental pattern longer in pitch than other incremental patterns is disposed on the center axis side than the point light source.

4. The encoder according to claim 3, wherein:
the two first light-receiving arrays are configured to receive light respectively reflected by two of the slit tracks comprising an absolute pattern; and
the two second light-receiving arrays are configured to receive light reflected by one of the slit tracks comprising an incremental pattern.

5. The encoder according to claim 2, wherein:
the two first light-receiving arrays are configured to receive light respectively reflected by two of the slit tracks comprising an absolute pattern; and
the two second light-receiving arrays are configured to receive light reflected by one of the slit tracks comprising an incremental pattern.

6. The encoder according to claim 1, wherein:
the third light-receiving array is configured to receive light reflected by the slit track comprising the incremental pattern shorter in pitch than other incremental patterns, and is disposed so as to sandwich the first light-receiving array with the point light source.

7. The encoder according to claim 6, wherein:
the measurement direction is a circumferential direction with a center axis as the center; and
the third light-receiving array configured to receive light reflected by the slit track comprising the incremental pattern shorter in pitch than other incremental patterns is disposed on the side opposite the center axis than the point light source.

8. The encoder according to claim 7, wherein:
the two first light-receiving arrays are configured to receive light respectively reflected by two of the slit tracks comprising an absolute pattern; and
the two second light-receiving arrays are configured to receive light reflected by one of the slit tracks comprising an incremental pattern.

9. The encoder according to claim 6, wherein:
the two first light-receiving arrays are configured to receive light respectively reflected by two of the slit tracks comprising an absolute pattern; and
the two second light-receiving arrays are configured to receive light reflected by one of the slit tracks comprising an incremental pattern.

10. The encoder according to claim 1, wherein:
the third light-receiving array is disposed between the two first light-receiving arrays.

11. The encoder according to claim 10, wherein:
the two first light-receiving arrays are configured to receive light respectively reflected by two of the slit tracks comprising an absolute pattern; and
the two second light-receiving arrays are configured to receive light reflected by one of the slit tracks comprising an incremental pattern.

12. A motor with an encoder, comprising:
a linear motor wherein a mover moves with respect to a stator, or a rotary motor wherein a rotor rotates with respect to a stator; and
the encoder according to claim 1 configured to detect at least one of a position and a velocity of the mover or the rotor.

13. A servo system comprising:
a linear motor wherein a mover moves with respect to a stator, or a rotary motor wherein a rotor rotates with respect to a stator;
the encoder according to claim 1 configured to detect at least one of a position and a velocity of the mover or the rotor; and
a controller configured to control the liner motor or the rotary motor based on a detection result of the encoder.

14. An encoder, comprising:
a plurality of slit tracks that respectively comprise a plurality of reflection slits arranged along a measurement direction;
a point light source configured to emit diffusion light to the plurality of slit tracks;
two first light-receiving arrays disposed sandwiching the point light source in a width direction substantially orthogonal to the measurement direction;
two second light-receiving arrays disposed substantially sandwiching the point light source in the measurement direction; and
two third light-receiving arrays that are configured to receive light reflected by the slit track comprising an incremental pattern that differs in pitch from other incremental patterns, and are disposed substantially sandwiching the point light source in the measurement direction between the two first light-receiving arrays.

15. A motor with an encoder, comprising:
a linear motor wherein a mover moves with respect to a stator, or a rotary motor wherein a rotor rotates with respect to a stator; and
the encoder according to claim 14 configured to detect at least one of a position and a velocity of the mover or the rotor.

16. A servo system comprising:
a linear motor wherein a mover moves with respect to a stator, or a rotary motor wherein a rotor rotates with respect to a stator;

the encoder according to claim 14 configured to detect at least one of a position and a velocity of the mover or the rotor; and a controller configured to control the liner motor or the rotary motor based on a detection result of the encoder.

17. An encoder, comprising:

a plurality of slit tracks that respectively comprise a plurality of reflection slits arranged along a measurement direction;

means for emitting diffusion light to the plurality of slit tracks;

means for outputting a signal representing a low-accuracy absolute position within one rotation, disposed in duplicate sandwiching the means for emitting the diffusion light in a width direction substantially orthogonal to the measurement direction;

means for outputting a highly periodical repetition signal, disposed in duplicate sandwiching the means for emitting the diffusion light in the measurement direction; and means for receiving light reflected by the slit track comprising an incremental pattern that differs in pitch from other incremental patterns, disposed at a position in a direction where the means for outputting a signal representing the low-accuracy absolute position within one rotation is disposed than the means for emitting the diffusion light.

\* \* \* \* \*